(12) United States Patent
Szyperski et al.

(10) Patent No.: US 7,680,935 B2
(45) Date of Patent: Mar. 16, 2010

(54) ENTITY DOMAINS

(75) Inventors: Clemens A. Szyperski, Redmond, WA (US); Brad M. Olenick, Redmond, WA (US); Balasubramanian Shyamsundar, Redmond, WA (US); Arshad F. Ahmad, Bellevue, WA (US); Arthur H. Watson, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 1567 days.

(21) Appl. No.: 10/955,693

(22) Filed: Sep. 30, 2004

(65) Prior Publication Data

US 2006/0070031 A1 Mar. 30, 2006

(51) Int. Cl.
*G06F 9/44* (2006.01)
(52) U.S. Cl. .................. 709/226; 709/223; 709/229; 709/204; 709/218; 717/120; 717/100; 717/136; 717/114; 717/116
(58) Field of Classification Search ................ 709/226, 709/223, 224, 225, 204, 218, 229
See application file for complete search history.

(56) References Cited

U.S. PATENT DOCUMENTS

| | | | |
|---|---|---|---|
| 5,832,224 A * | 11/1998 | Fehskens et al. ............ 709/223 |
| 6,047,377 A | 4/2000 | Gong | |
| 6,212,436 B1 | 4/2001 | Marple et al. | |
| 6,466,932 B1 | 10/2002 | Dennis et al. | |
| 6,473,773 B1 | 10/2002 | Cheng et al. | |
| 6,611,837 B2 | 8/2003 | Schreiber | |
| 6,636,866 B1 | 10/2003 | Ramalingam | |
| 7,260,712 B2 * | 8/2007 | Chandramouleeswaran et al. ............................ 713/1 |
| 2004/0045013 A1 | 3/2004 | Lam | |

FOREIGN PATENT DOCUMENTS

| | | |
|---|---|---|
| EP | 1426857 A | 6/2004 |
| WO | WO0010079 A1 | 2/2000 |

OTHER PUBLICATIONS

Batory, et al., "The Design and Implementation of Hierarchical Software Systems with Reusable Components", ACM, vol. 1, No. 4, Oct. 1992, pp. 355-398.

(Continued)

*Primary Examiner*—Jude J Jean Gilles
(74) *Attorney, Agent, or Firm*—Lee & Hayes, PLLC

(57) ABSTRACT

Strategies are described for organizing the runtime components of an application into an entity domain framework. The entity domain framework includes one or more entity domains arranged in a hierarchical fashion. Each entity domain further groups one or more components together in a hierarchical fashion. Each entity domain can include one or more services that provide a policy to the components within the entity domain. Composite functionality couples the framework together, and further provides a bus-like mechanism whereby an entity can forward service requests up through the hierarchy until a domain is found that satisfies the requests. Exemplary services provided by the entity domain framework include lifetime management services, error handling services, and so forth. The hierarchical structure provides an efficient way of exposing functionality to groups of components that will share this functionality in a common context, without requiring costly and complex atomistic coupling of services to components or duplication of service instances.

31 Claims, 9 Drawing Sheets

OTHER PUBLICATIONS

D'Alessandro, et al., "The Generic Reusable Component: an Approach to Reuse Hierarchical OO Designs", IEEE, 1993, pp. 39-46.

"Introduction to COM and COM+," Accessed from Microsoft Corporation's MSDN online site on Jan. 22, 2005, available at: <http://msdn.microsoft.com/library/default.asp?url=/library/en-us/his_2004Main/htm/his_ti_developers_guide_wnpq.asp>, 20 pages.

Anew Whitchapel, "Containment and Aggregation," Apr. 12, 2001, accessed on Jan. 29, 2005, available at <http://www.codeguru.com/Cpp/COM-Tech/atl/article.php/c3579/>, 14 pages.

"Inheritance, Aggregation, and Containment," Accessed from Microsoft Corporation's MSDN online site on Jan. 29, 2005, available at: <http://msdn.microsoft.com/library/default.asp?url=/library/en-us/cpguide/html/cpconinheritanceaggregationcontainment.asp>, 2 pages.

"Step 14: Making an OLE container," accessed on Jan. 29, 2005, available at: <http://info.borland.com/techpubs/borlandcpp/owl50tut/olecont.htm>, 19 pages.

Colan et al., "Let Infobus Plug Your Beans Together: Equip your JavaBeans to exchange data without knowing beans about each other," Mar. 1998, available at <http://java.sun.com/developer/technicalArticles/jbeans/Infobus/>, 9 pages.

L. Cable, "Extensible Runtime Containment and Server Protocol for JavaBeans Version 1.0," Sun Microsystems, Inc., Dec. 2, 1998, 23 pages.

O. Kluyt, "JavaBeans Technology: Unlocking the BeanContext API,"May 1999, accessible at: <http://java.sun.com/developer/technicalArticles/jbeans/BeanContext/>, 6 pages.

J. Mojica, "COM+ Programming with Visual Basic; Developing COM+, and .NET," Jun. 2001, Chapter 11, available at O'Reilly Online Catalog: <http://www.oreilly.com/catalog/compluspvb/chapter/ch11.html>,38 pages.

* cited by examiner

ENTITY DOMAINS

TECHNICAL FIELD

This subject matter relates to improved strategies for managing machine-readable code components.

BACKGROUND

Applications can perform their prescribed tasks using a collection of code components. In the illustrative case of object-oriented programming, for example, applications can allocate, in their source code, different classes that can be used at runtime to provide functionality for performing defined tasks. Namely, at runtime, a computing machine can instantiate these classes to provide specific objects (also referred to as "instances"). These objects are stored in an allocated portion of the computing machine's memory. After these objects have served their respective purposes and are no longer needed, the computing machine can run so-called garbage collection functionality to remove these objects from memory, thus providing room for the creation and storage of additional objects.

At any given time in the application's runtime performance, the computing machine's memory can be expected to store a large collection of runtime code components. These code components must interact with each other to perform their prescribed tasks. To this end, an application will provide functionality for "wiring" these code components together. The wiring allows components to refer to other components, such that the components can exchange information among themselves to perform their allotted tasks.

An application will typically apply some protocol in creating, managing, and severing such wiring links between components. Externally, such a protocol results in a logical flow of user interface presentations for consumption by an end-user. Internally, however, the protocol may generate a complex mesh of component interdependencies that is essentially unstructured.

A number of difficulties stem from traditional techniques for managing instances of code components. For instance, a code developer may have great difficulty in understanding the internal runtime behavior of an application. This can prevent the developer from proactively testing the application to discover potential software errors, and can also prevent the developer from successfully uncovering the source of errors that have been detected. Generally, software errors that manifest themselves at runtime (as opposed to, for example, compile-time) often have a latent nature, occurring only when certain conditions are present during the execution of the application. In the traditional approach, it may thus be difficult to uncover these errors before a program is shipped to a customer. In other cases, the application may provide its services in an error-free manner, yet because of various problems, it may do so in a suboptimal manner (that is, by using more memory than should be required, or taking more time than should be required).

One particularly vexing source of errors stems from traditional garbage collection techniques. These traditional techniques determine whether an object is no longer needed by keeping track of the reference links that point to the object. When the number of links reaches zero, the garbage collection functionality disposes of the object. This technique can impose complex accounting demands, as it must maintain accurate counts of many reference links. Due to this complexity, this accounting task is often a source of error. A common error results when an object no longer has any use, yet an instance still maintains a reference link to the object. This has the effect of keeping the object alive when it should be removed, thereby creating a kind of "zombie" instance. Needless to say, this kind of error can result in various problems, ranging from poor memory utilization (e.g., "resource leaks") to program crashes. Traditional strategies are not well equipped to resolve these kinds of problems. Namely, because these strategies rely on an unstructured mesh of instances at runtime that may be poorly understood by the code developer, it becomes difficult to detect the occurrences of such "zombie" instances that may be collecting within the mesh.

Further, the use of traditional methods prevents a developer from writing code that efficiently provides certain functionality to groups of components at runtime. For instance, a developer may attempt to provide certain functionality to various components by "wiring" instances of this functionality to the components that need this functionality using various paradigms. However, atomistic coupling of services to individual components is costly, as it requires the storage of reference information which describes these separate links. Further, as appreciated by the present inventors, known approaches fail to provide suitable mechanisms for allowing components that rely on the same functionality, and therefore share a common "context," to access such functionality in an efficient manner. Conventional techniques for sharing context (such as by using global variables) provide sharing on a relatively coarse-grained basis (e.g., on a process or thread level), and are therefore inadequate solutions to this problem.

For at least these illustrative and exemplary reasons, there is a need for more efficient strategies for managing code components at runtime that eliminate or reduce the occurrence of one or more of the problems identified above.

SUMMARY

According to one exemplary implementation, a method is described for running machine-readable code that includes a collection of components at runtime. The method comprises grouping at least one code component into a hierarchically-structured entity domain, wherein the entity domain is subject to at least one prescribed policy (referred to below, for simplicity, as a singular "prescribed policy"), and managing the code component in accordance with the policy of the entity domain.

According to another exemplary aspect, the grouping comprises providing a plurality of entity domains subject to respective policies.

According to another exemplary aspect, the plurality of entity domains are linked together in parent-child relationships.

According to another exemplary aspect, each of the entity domains provides respective composite functionality that couples the plurality of entity domains into a hierarchical entity domain framework.

According to another exemplary aspect, the composite functionality provided by the plurality of entity domains collectively defines a coupling mechanism through which an entity may send requests through the entity domain framework.

According to another exemplary aspect, a request made within a particular entity domain is processed by: (a) determining whether the particular entity domain can satisfy the request, and if so, processing the request at the particular entity domain; (b) if the particular entity domain cannot satisfy the request, determining whether the particular entity domain's parent entity domain can satisfy the request, and if so, processing the request at the parent entity domain; and (c) if the parent entity domain cannot satisfy the request, repeating operation (b) until the request is satisfied or it is determined that the request cannot be satisfied.

According to another exemplary aspect, the above-mentioned policy provided by the entity domain pertains to lifetime management of the above-mentioned at least one component, and the managing comprises governing the deterministic shutdown of the above-mentioned at least one component based on the lifetime management policy.

According to another exemplary aspect, the shutting down of the entity domain in accordance with the lifetime management policy comprises: coordinating recursive shutdown of any nested lifetime domains included within the entity domain; providing a shutdown notification to at least one component which has registered to receive such notification in advance; and severing reference links from objects outside the entity domain into the entity domain.

According to another exemplary aspect, the above-mentioned policy provided by the entity domain pertains to error handling management, and wherein the managing comprises governing the orderly handling of errors associated with the above-mentioned entity domain based on the error handling management policy.

According to another exemplary aspect, the entity domain is a nested entity domain within at least one other enclosing entity domain, and wherein the managing comprises deferring an error handling task to the above-mentioned at least one enclosing entity domain if the nested entity domain cannot satisfactorily process the error handling task.

Additional exemplary implementations are described in the following.

Figure 1:
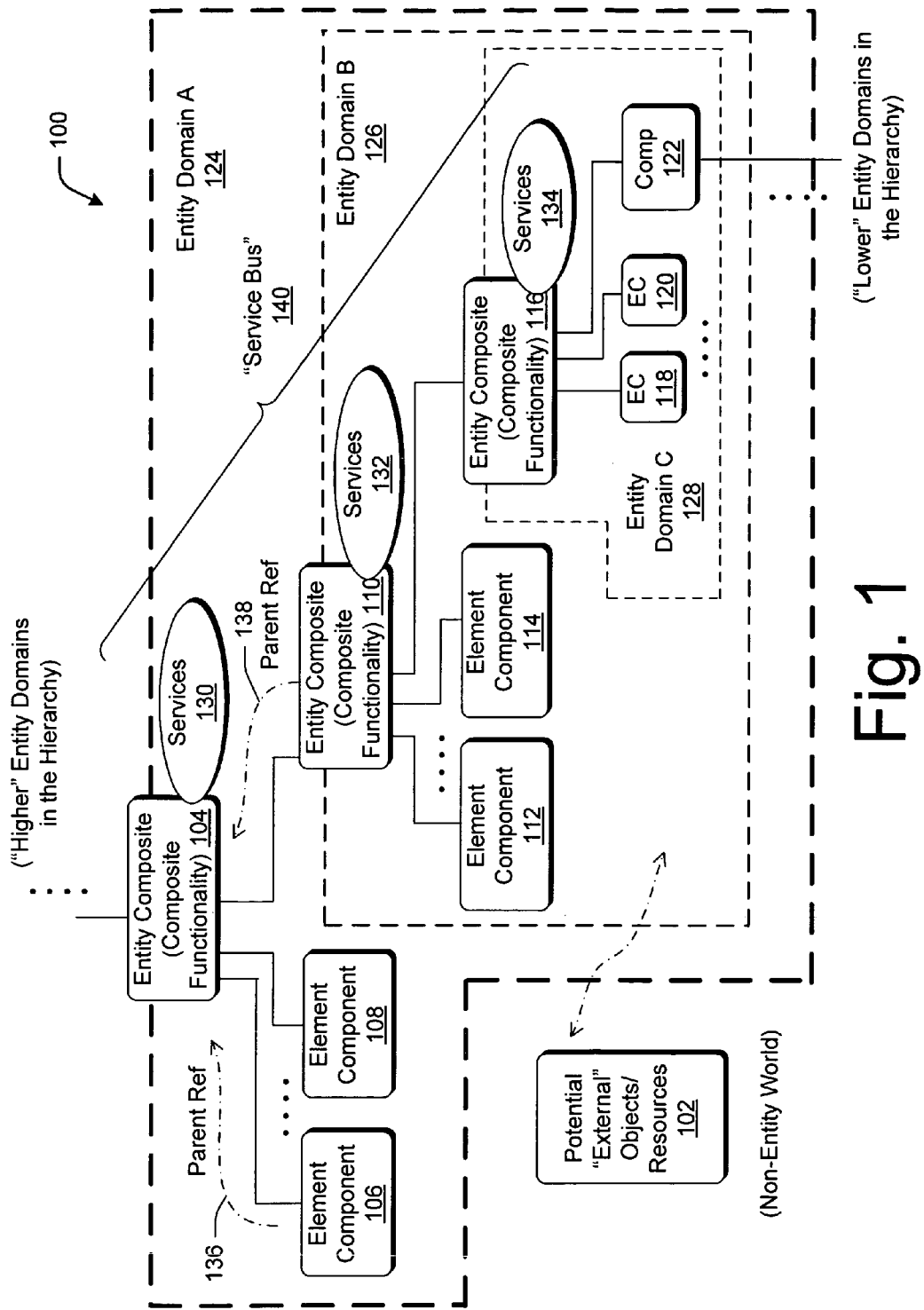
FIG. 1 illustrates an exemplary organization of components into an entity domain framework.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

The following description sets forth exemplary strategies for grouping components into an entity domain framework and for managing the components using this framework. The entity domain framework can organize the components into a hierarchical structure of entity domains. Each entity domain can include one or more element components and composite functionality. The composite functionality groups the element components together within an entity domain. The entity domain framework also couples the composite functionality of respective entity domains together to create the hierarchical structure of entity domains.

Each entity domain can provide one or more services. Generally, entities are precluded from directly interacting with the entity domain framework. An entity within the entity domain framework can access a service using lookup functionality. The lookup functionality accesses the service by moving up through the hierarchy, successively determining whether each entity domain can furnish the requested service.

In one exemplary application, lifetime management services are applied to the entity domains, to thereby establish lifetime domains. The lifetime services govern the manner in which the entities within the lifetime domains are removed upon shutdown. Each lifetime domain includes a lifetime director to implement the lifetime services. Further, each lifetime domain can be directly managed by a lifetime owner. Lifetime domains can be nested in other lifetime domains. The lifetime director coordinates the shutdown of its enclosing lifetime domain by shutting down its nested lifetime domains, starting with the most deeply nested lifetime domain. The lifetime director also issues shutdown notifications to any components that have previously registered to receive shutdown notifications (referred to below as "registrant components"). One kind of registrant component is a resource manager, which, as the name suggests, serves the role of managing some kind of resource (e.g., a database resource, etc.). The owner serves the purpose of initiating shutdown operation. The owner also performs the role of severing links from objects outside of its lifetime domain that point into the lifetime domain.

In another exemplary application, error management services are applied to the entity domains, to thereby establish error handling domains. Each error handling domain includes an error handling director to implement the error handling services. Like the lifetime domains, the entity domain framework can provide nested error handling domains. A nested error handling director may address an error detected within its domain by determining whether it can handle the error locally using the services within its local error handling domain. If this cannot be performed, the error handling director defers the job of handling the error to the enclosing error handling domain, which may be able to successfully handle the error, and if not, will pass the error to its own enclosing error handling domain. The error handling domain that can successfully process the error can take any corrective actions, such as shutting down part (or all) of the application.

The entity domain framework has numerous merits. According to one merit, the entity domain design enables a code developer to better understand what is happening to an application at runtime. This enables the code developer to more easily test the application, and to more easily discover the causes of detected errors. This feature therefore has the potential of producing code that has fewer errors.

According to another merit, the entity domain design provides a more reliable technique for shutting down parts of an application. Namely, the technique described herein (e.g., involving nested shutdown in combination with owner notification) provides an orderly protocol for systematically and predictably releasing components upon shutdown. This technique also better ensures that references to components that are being shut down are removed. This is in contrast to the known techniques described in the Background section which use various conventional garbage collection protocols. These techniques do not take advantage of the entity domain structure described herein, and therefore have the potential of releasing components in an un-orderly manner upon shutdown or failing to release the components at all. This increases the potential that components will be kept inappropriately alive, thereby producing "zombie" components.

According to another merit, the shutdown mechanism described herein provides a generally applicable shutdown protocol that can be applied to a wide variety of design spaces within a system. This is in contrast to known shutdown protocols which are custom-designed to narrowly serve specific respective design spaces.

According to another merit, the design provides a structured and efficient mechanism for exposing a policy to respective groups of components within an application that utilize this policy (and thereby share the same "context"). Namely, through the lookup functionality, components within an entity domain can utilize services made commonly available to the domain. This can help reduce the amount of complex peer-to-peer unstructured linkages among components. Moreover, the design includes encapsulation provisions that prevent the components from directly interacting with other aspects of the entity domain framework.

Still further advantages will be apparent to those skilled in the art upon reading the following description.

As to terminology, the term "component" refers to an object configured to perform prescribed tasks. In the context most commonly evoked in the following discussion, a component is an object (or instance) within the object-oriented programming paradigm. Further specific examples are provided in the context of a virtual programming environment, such as Microsoft's NET programming environment (provided by Microsoft Corporation of Redmond, Wash.). The .NET programming environment operates by producing compiled intermediary code, which is then executed at runtime using the services of common language runtime (CLR) functionality. However, these examples are merely exemplary and illustrative; the principles described herein can be applied to any programming paradigm in the context of any technical platform.

This disclosure includes the following sections. Section A describes an exemplary entity domain framework. Section B describes exemplary services that can be applied to the entity domain framework. Section C describes an exemplary series of flowcharts which explain certain aspects of the operation of the entity domain framework. And section D describes an exemplary computer environment for implementing the entity domain framework.

A. Exemplary System

Generally, any of the functions described herein can be implemented using software, firmware (e.g., fixed logic circuitry), manual processing, or a combination of these implementations. The terms "module," "component" "functionality," and "logic" as used herein generally represent software, firmware, or a combination of software and firmware. In the case of a software implementation, the terms "module," "component," "functionality," or "logic" represent program code that performs specified tasks when executed on a processing device or devices (e.g., CPU or CPUs). The program code can be stored in one or more fixed and/or removable computer readable memory devices. The memory can be provided at one site or several sites in distributed fashion.

A.1. Overview of an Entity Domain Framework

FIG. 1 shows an exemplary hierarchical organization of components into an entity domain framework 100. This organization is manifested at runtime. Runtime refers to the instantiation of programming components when an application program (an "application" for brevity) is executed. For instance, in the exemplary and non-limiting case of an object-oriented programming paradigm, runtime can involve creating objects as needed from a collection of classes, storing these objects in a memory heap, and then removing these objects when they are no longer needed using garbage collection functionality. In this case, the organization is manifested in the relationship between objects in memory as the application is being run. Examples are presented herein that provide further details regarding one exemplary implementation of the entity domain framework 100 in the context of Microsoft Corporation's NET programming environment. However, as stated above, these implementations are illustrative and non-limiting; the term "components" can refer to any unit of code in any programming paradigm and technical platform.

The components are referred to as "entity components." As this term is used herein, the qualifier "entity" denotes that the components comply with certain rules (to be described below) that enable the components to serve as members of the entity domain framework 100. The entity components can interact with non-entity components 102, e.g., in one case, through appropriate coupling mechanisms (not shown). Broadly stated, non-entity components 102 are components that are not subject to the same rules that entity components are subject to.

Generally, entity components implement different aspects of any kind of application. For instance, in the object-oriented paradigm, the entity components may correspond to separate objects (instances) of classes, which have various methods and associated properties for performing various tasks within an application. In the specific case of an application that provides a user interface (UI) presentation, separate components may provide different features of the UI presentation. In an inventory application, the separate components may provide different features of the program's accounting functionality, and so forth. These are merely illustrative and non-limiting examples of a vast number of applications that the entity domain framework 100 can be applied to.

The entity domain framework 100 has a hierarchical construction. That is, entity components in the framework 100 are coupled to other entity components in a parent-child relationship (as well as peer-to-peer relationship). To implement this organization, the entity framework 100 includes two kinds of entity components (referred to for brevity as simply "components" below): element components and composite components. Elements components refer to components that lack children. Element components implement aspects of the behavior of an application. Composite components refer to components that may include plural members. Composite components therefore can contain a group of entity components, including both element and other composite components. A composite component includes so-called composite functionality that allows it to function as a group. Consider a group "X" of components having members "A," "B" and "C." Referring to the group as a composite, as this term is used herein, means that reference is being made to the multi-bodied nature of the group, e.g., by implicitly enumerating its individual members (A, B, and C). Referring to the composite functionality provided by this group evokes its status as group X, specifically including the functionality which allows it to function as a group and to interact with other groups in the entity domain hierarchy.

FIG. 1 shows one exemplary and non-limiting organization of element components and composite components (which, in turn, include composite functionality). Namely, composite functionality 104 defines a first-level composite grouping, including exemplary element components 106 and 108. This first-level composite grouping also includes other composite functionality 110, which defines a second-level composite grouping. The second-level composite grouping includes exemplary element components 112 and 114. The second-level composite grouping also includes other composite functionality 116, which, in turn, defines a third-level composite grouping. The third-level composite grouping includes element components 118 and 120, and further composite functionality 122. FIG. 1 may represent only a small fragment of a more encompassing entity framework 100. For instance, the top-level composite functionality 104 may couple to still higher levels (not shown), and the third-level composite functionality 122 may couple to still lower levels (not shown). Note that the term "higher" is shorthand metaphorical reference to further enclosing domains (e.g., parent and ancestors levels), while the term "lower" is shorthand metaphorical reference to further nested domains (e.g., child levels); strictly speaking, a programming environment does not discriminate between "up" and "down."

In an actual exemplary implementation, a top-level component grouping may correspond to the most abstract representation of an entire application. This top level can be represented by root composite functionality (not shown) that has no parent. The lowest levels may correspond to relatively small details within the application, such as individual user interface controls, and so forth. These examples are merely illustrative. Moreover, FIG. 1 shows a hierarchy defined by a single chain of nested composite functionality (104, 110, 116, 122). However, other entity domain frameworks can include multiple chains of nested composite functionality. For instance, another entity domain framework (not shown) can include multiple branches of composite functionality to define a relatively complex tree of such components. In this case, the entity domain framework may include peer components that share one or more common ancestor components, but otherwise have a kind of lateral or graph-like relationship with respect to each other; a lateral or graph-like relationship here means any kind of relationship other than parent-child relationship (defining a tree-like relationship).

Each composite grouping (represented by composite functionality) defines a separate so-called entity domain. For instance, composite functionality 104 defines a first-level entity domain 124 (A); composite functionality 110 defines a second-level entity domain 126 (B); and composite functionality 116 defines a third-level entity domain 128 (C). The boxes having dashed-line borders pictorially denote the scope of these three separate entity domains. As stated above, the entity domain framework 100 may represent only a fragment of a more encompassing hierarchical tree; as such, the entity domain framework 100 can include more entity domains than is illustrated in FIG. 1.

To provide one illustrative and non-limiting example, entity domain 124 may correspond to a user interface window-type presentation; entity domain 126 might correspond to a scroll bar feature within that window-type presentation; and entity domain 128 might correspond to one particular component of the scroll bar feature, such as the scrollable thumb piece in the middle of the scroll bar, and so forth. A top-level entity domain (not shown) may correspond to the application as a whole.

The grouping of components in an entity domain is subject to any kind of shared policy. Loosely stated, the policy specifies one or more rules that collectively apply to members within the entity domain. As previously mentioned, one exemplary policy may pertain to lifetime management of the components within the entity domain. Lifetime management refers to the rules that govern the removal of components within the entity domain. Another exemplary policy may pertain to error handling management. Error handling refers to the rules that govern how detected errors are handled by the entity domain. These policies are merely illustrative of a wide variety of rules that can be applied to an entity domain. Section B (below) provides detailed information regarding exemplary implementations of lifetime domains and error handling domains.

An entity domain provides the above-described policies by means of one or more services. For instance, the first-level entity domain 124 can provide a collection of services 130. The second-level entity domain 126 can provide another collection of services 132. And the third-level entity domain 128 can provide another collection of services 134. (Alternatively, one or more entity domains can omit certain services.) In the specific example of FIG. 1, the services (130, 132, 134) are hierarchically nested, such that services 130 of the first-level entity domain 124 may be available to the second-level entity domain 126 and the third-level entity domain 128, and the services 132 of the second-level entity domain 126 may be optionally available to the third-level entity domain 128. Consider, for instance, the case of error handling services. The first-level entity domain 124 may provide a general catch-all error handler for addressing a certain class of errors detected within any entity domain (124, 126, 128), while other, more deeply nested, entity domains (e.g., 126, 128) may provide error handlers more finely tailored to the specific kinds of errors that may occur within their respective domains (126, 128). Assume that an error is detected by an entity that is a member of the third-level entity domain 128. The entity domain framework 100 may attempt to address this error using the local services 134 provided by the third-level entity domain 128. However, if these services are not adequate to address the error, then the composite functionality 116 may defer the task of error processing to the second-level entity domain 126. Entity domain 126 can, in turn, defer the error to the first-level entity domain 124 if it cannot successfully address it. Section B.2 provides more information regarding the process of error escalation in the entity domain framework 100.

In other cases, local services (e.g., services 132, 134) can override or modify general services provided by enclosing (parent) entity domains. In other cases, the entity domain framework 100 can prevent an entity domain (and its associated composite functionality) from accessing the services provided by higher levels in the entity domain framework 100. In other cases, the entity domain framework 100 can provide redundant instances of certain basic services within all of the entity domains, so that an entity within these entity domains does not need to search for these services by climbing the hierarchy.

The following subsections provide additional details which explain the general principles described above.

A.2. Coupling Mechanism and Encapsulation Provisions

Still referring to FIG. 1, the hierarchical structure of the entity domain framework 100 is maintained through a collection of references that tie the components in the framework 100 together. Namely, each component is coupled to its entity domain by reference information that links it to its respective parent. One way of implementing child-to-parent coupling is by providing parent reference information to each child component upon the construction of each child component. The parent reference information links the child component to its composite component. This provision facilitates a top-down construction of the entity domain framework 100 because the entity domain framework 100 grows by adding child components in successive fashion to parent components. For example, reference 136 links element component 106 with its corresponding entity domain 124 (reified, in part, by composite functionality 104). Furthermore, as part of a special policy (such as lifetime management), the child element components can register with their parents and ancestors; this provides the parents and ancestors with information regarding their respective children. This information becomes useful in various circumstances, such as when a parent entity domain wishes to shut down its nested entity domains. However, except in these special cases, a parent does not have access to reference information which identifies its children. This feature is beneficial because it does not introduce reference information which can potentially interfere with the garbage collection of components that are ripe for collection.

The composite functionality (104, 110, 116) can be coupled together in the above-described manner. That is, child composite functionality can couple to its parent composite functionality by virtue of reference information which identifies its parent. For instance, reference 138 links composite functionality 110 with parent composite functionality 104. In certain policy-specific circumstances, parent composite functionality can also include a mechanism for determining what child composite components depend from the parent composite functionality.

The hierarchical tree of linked composite functionality (104, 110, 116, 122) forms a conduit through which actors within the entity domain framework 110 can access various services. This conduit is referred to as a service bus 140. The conduit is like a bus in the sense that it permits actors to place requests for services through a general request protocol without requiring explicit point-to-point coupling between individual actors in the framework 110 and respective instances of services. The request protocol (provided by a lookup service) accesses a requested service by making, if necessary, successive inquiries at different levels of the hierarchy, until its reaches an entity domain having the requested service.

The service bus is superior to other strategies for a number of reasons. A point-to-point strategy can require atomistic coupling of objects to services. Another strategy can, in advance, duplicate the services for each object that needs the services. In contrast, through the use of the unique service bus 140 of the present framework 100, an entity within the framework does not need to, in advance, provide a specific link to the service that it may need, or a separate instance of a service that it may call upon. When the entity requires the service, it can request the service by specifying a service type. It receives this service at some level in the hierarchy via the service bus 140. This approach is less complex and more memory-efficient than certain alternatives. For example, known strategies for interacting with services may generally add overhead to the runtime implementation of the application, which, in turn, can increase its memory footprint, and can result in other runtime inefficiencies; the design described herein can eliminate or reduce these shortcomings. A specific example of memory savings is due to the fact that the entity does not need to store separate references to each of the services that may be available to it; the entity can store a single reference which allows it to access a lookup service, whereupon the lookup service can access any of the multiple services. (As mentioned in the Background section, some conventional techniques implement shared contexts through the use global variables, thereby achieving some gains in efficiency and performance; however, these techniques provide scoping at relativity coarse-grained levels, e.g., at the process or thread levels, which fails to yield the benefits described herein through the unique use of entity domains). The next subsection provides further details regarding an exemplary lookup protocol that can be used to implement the service bus 140.

While the lookup provisions allow components to access certain services, the entity domain framework 100 may include provisions for otherwise restricting the exchange of information between components within the entity domain framework 100. According to one such provision, the entity domain framework 100 can include protection and encapsulation functionality which prevents any entity component from discovering certain features of the entity domain framework 100. More specifically, as described above, it is true that the entity domain framework 100 can allow any component to discover reference information which identifies its parent. The entity domain framework 100 can also allow any component to access a lookup service, which, in turn, enables the component to access services provided by its local entity domain or provided by enclosing entity domains. However, the entity domain framework 100 can also prevent any entity component from discovering information regarding its peers, the nature of services offered by composite functionality, the structure of the entity domain framework as a whole, and so forth. More specifically, the entity domain framework 100 can "prevent" a component from discovering such information in the sense that it does not provide mechanisms for discovering such information as part of the basic structure of the entity domain framework 100 itself. Nevertheless, the entity domain framework 100 remains versatile, such that a specific application can incorporate custom functionality that allows any degree of interaction among components. In other words, the entity domain framework 100 does not preclude such interaction among components; it simply does not provide it as part of its stock, or core, functionality.

Still further protection and encapsulation provisions can be employed to ensure the integrity of application resources.

A.3. Services and Lookup Functionality

Figure 2:
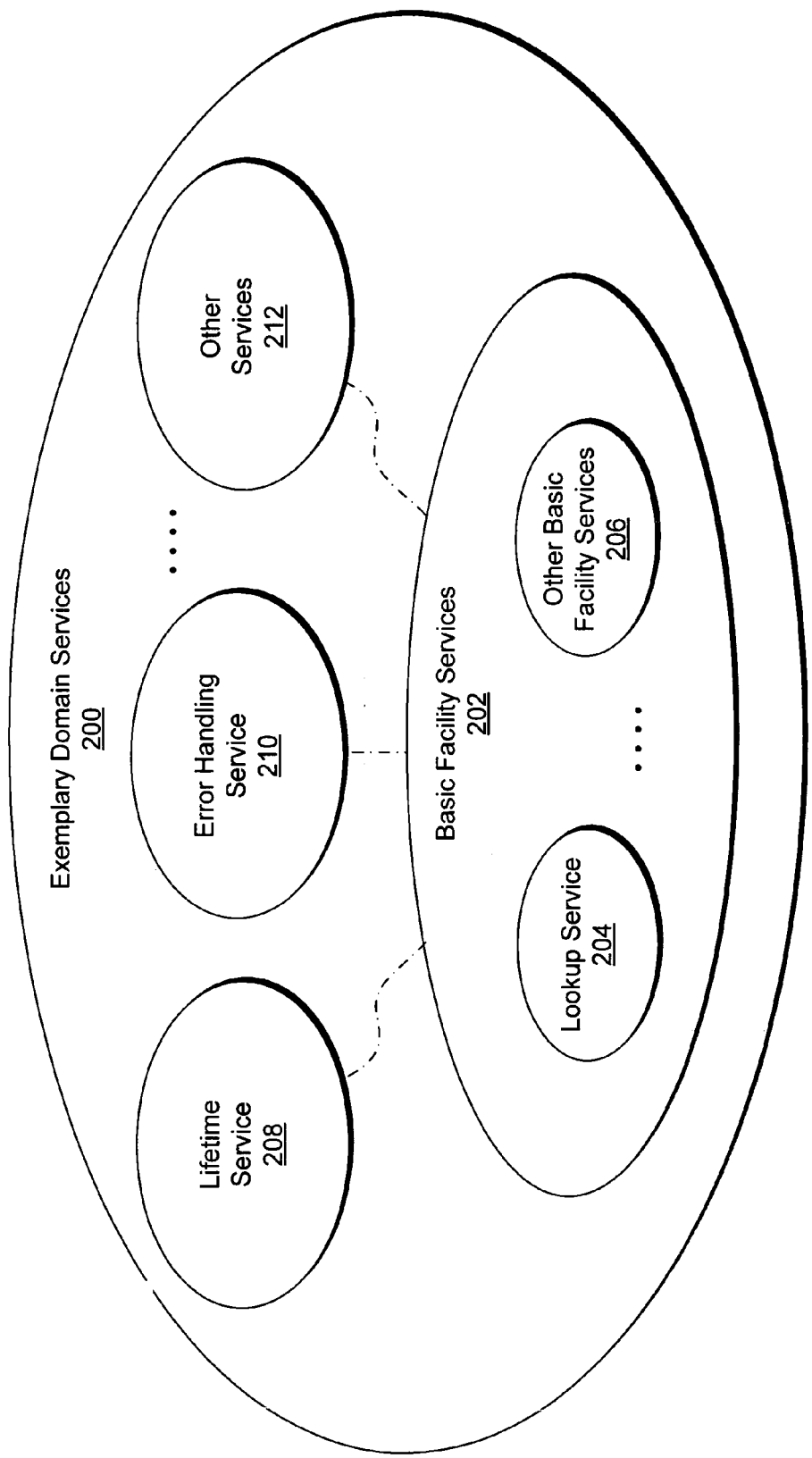
FIG. 2 illustrates an exemplary collection of services available within the entity domain framework of FIG. 1.

Advancing now to FIG. 2, this figure shows exemplary services 200 that the entity domain framework 100 shown in FIG. 1 can implement. Reference will also be made to certain features of FIG. 1 in explaining FIG. 2.

Services refer to any functionality that can be used, either directly or indirectly, by entity components within the entity domain framework 100 to perform one or more prescribed tasks. Certain services are more fundamental or basic than others, applying to a wide variety of different kinds of applications. FIG. 2 refers to fundamental services as exemplary basic facility services 202. One such basic facility service 202 is a lookup service 204. A component can invoke the lookup service 204 to request and access another service, such as an error handling service. The suite of basic facility services 202 can include other fundamental services, as generally denoted by the bubble in FIG. 2 labeled "other basic facility services" 206.

Other services in the group of services 200 may pertain to higher-order policies that may rely on the basic facility services 202. One such higher-order service is a lifetime service 208. An entity domain that includes the lifetime service 208 is referred to as a lifetime domain. As mentioned, the lifetime service 208 provides functionality which governs the manner in components are constructed and deactivated. Section B.1 provides detailed information regarding the lifetime service 208.

Another higher-order service is an error handling service 210. An entity domain that includes an error handling service 210 is referred to as an error handling domain. As mentioned, the error handling service 210 provides functionality which governs the manner in which errors discovered within the entity domain framework 100 are processed. Section B.2 provides detailed information regarding the error handling service 210.

The suite of higher-order service can include other such services, as generally denoted by the bubble in FIG. 2 labeled "other services" 212. Generally, FIG. 2's breakdown of services into higher-order services and basic facility services is a vehicle to promote understanding of the services, and is not to be construed as suggested that these services necessarily have markedly different characteristics. For instance, insofar as the lifetime service 208 and error handling service 210 are expected to be widely used by many types of applications, and possibly used by services of an even higher order nature, these services (208, 210) can alternatively be classified as basic facility services 202.

The above discussion identified the services 200 as separate functionality that can implemented by an application. However, a single application can apply multiple services, such as both the lifetime management service 208 and the error handling service 210. In certain cases, one kind of domain (such as a lifetime domain) may have the same members as another kind of domain (such as an error handling domain). In other cases, the membership of one kind of domain may differ from the membership of another kind of domain. In the latter case, different composite functionality can be allocated to different domains to define the different memberships of these domains, and the thus-created composites can publish different services for use by their members to thereby define the nature of the domains (e.g., a lifetime service defines a lifetime domain, and so forth).

The services 200 can be implemented in various ways. Generally, the services 200 can be implemented by the composite component itself or can be implemented by some sub-object (typically an element component) of the composite component. Or a particular application may use a combination of different techniques to implement different services, e.g., depending on the nature of the services and other factors. Still further implementations can be provided. Subsection A.4 (below) provides further details regarding an exemplary implementation of the entity components and their associated services.

Figure 3:
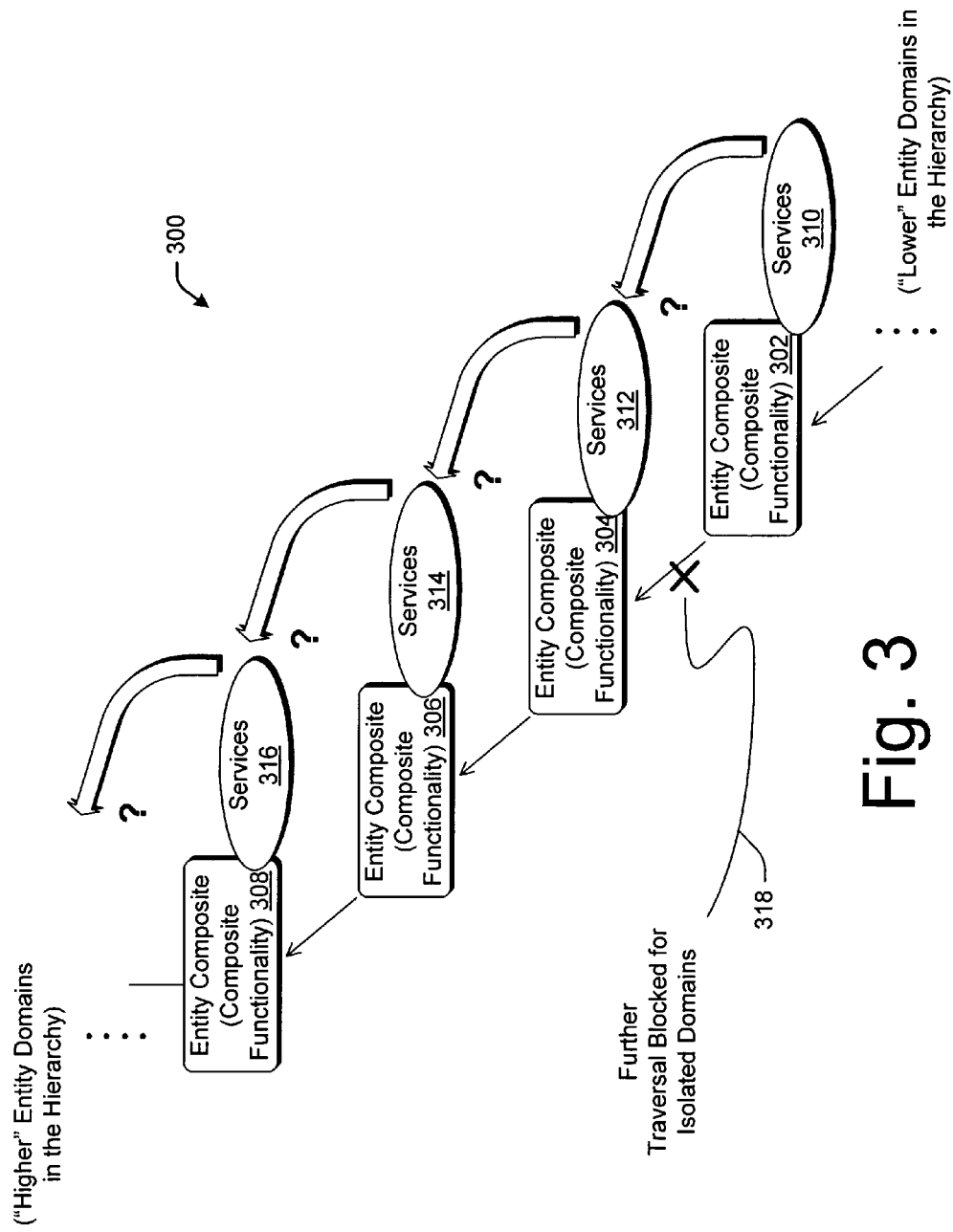
FIG. 3 illustrates the operation of exemplary lookup functionality that can be used to look up services in the entity domain framework of FIG. 1.

FIG. 3 shows a protocol 300 which governs the operation of the lookup service 204. In this example, the protocol 300 plays out in the context of an exemplary hierarchy of composite functionality (302, 304, 306, 308). Each of these composite functionalities (302, 304, 306, 308) defines respective entity domains, each of which may include one or more element components (not shown). Each composite functionality (302, 304, 306, 308) includes reference information which links it to its enclosing (parent) composite functionality. FIG. 3 shows a single chain of composite functionality (302, 304, 306, 308), but an entity domain framework can include a multi-branched tree of composite functionality of any complexity and size. (More specifically, from a top-down perspective, the entity domain framework 100 can be viewed as a tree, but any given child component in the entity domain framework 100 is related to the root of the tree through a single chain of references.) Further, the composite functionality (302, 304, 306, 308) may represent only part of a more encompassing entity domain framework (not shown).

Each composite functionality (302, 304, 306, 308) has access to services (310, 312, 314, 316) that are associated with each respective composite functionality (302, 304, 306, 308); that is, composite functionality 302 has access to services 310, composite functionality 304 has access to services 312, composite functionality 306 has access to services 314, and composite functionality 308 has access to services 316. In addition, in the manner described below, any entity in the entity domain framework 100 may access any services provided by parent or ancestor composite functionality.

To illustrate the operation of the lookup service 204, assume that an entity (not shown) associated with the composite functionality 302 requests a particular service by specifying a service type. In response, the composite functionality 302 will first determine whether its local services 310 can furnish the requested service. If so, the composite functionality 302 furnishes this service. If the composite functionality 302 cannot provide the requested service, then the lookup service 204 next queries the composite functionality 304 to determine whether it can provide the requested service. The lookup service 204 repeats this process, successively advancing up through the hierarchy of entity domains until an entity domain is found that can furnish the requested service. For instance, this lookup protocol 300 may advance all the way to the root of the entity domain hierarchy (not shown). The above-described mechanism implements the service bus 140 introduced with reference to FIG. 1.

A number of exceptions can be applied that vary the behavior of the service bus 140. In one technique, a local entity domain can cache a service that it has previously accessed from an enclosing parent or ancestor entity domain. When that local entity domain requires access to the service again, it can access the service from its cache. This avoids the need to perform the recursive search identified above.

In another technique, an entity domain framework can isolate an entity domain. This provision prevents the lookup service 204 from advancing up the entity domain hierarchy beyond the isolated entity domain. In other words, isolating an entity domain essentially causes a lookup search to terminate at the isolated entity domain. FIG. 3 denotes this feature by an "X," which represents a block that prevents the lookup service 204 from advancing beyond this point. This provision effectively renders composite functionality 302 as a pseudo-root, at least with respect to the availability of the requested service that is blocked. This can be implemented by providing a special composite component that is configured such that its lookup service does not consult the composite's parent.

A.4. Exemplary Implementation of Entities

As described above, the entities in the entity domain framework 100 can be implemented using object-oriented programming techniques. More specifically, composite functionality can be instantiated based on a first base class (e.g., EntityComposite). Instantiation of a composite functionality establishes an entity domain. Element components can be instantiated based on a second base class (e.g., EntityElement). Exemplary code excerpts that implement these two respective classes are provided below:

```
public abstract class EntityComposite : IEntityDomain, . . .
{
    protected EntityComposite (IEntityDomain entityDomain) { . . . }
    . . .
}
```

-continued

```
public abstract class EntityElement
{
    protected EntityElement (IEntityDomain entityDomain) { ... }
    ...
}
```

According to one exemplary and non-limiting implementation, the entity domain framework 100 establishes entity domain relationships by passing a parent entity domain reference (IEntityDomain) to child components during construction as a constructor parameter. Entity constructors can then pass this information to their base class (EntityElement or EntityComposite) constructors. Both the EntityElement and EntityComposite base classes hold this reference and initialize it in their constructors. (Generally, in this exemplary implementation, isolated base class code is responsible for management of these upward links.) This model enforces a top-down construction. Top-down construction, with set-once semantics of parent reference, precludes the introduction of cycles into the entity domain structure itself.

The base classes provide functionality that allows the components created using these base classes to perform the tasks described in the previous sections. For instance, in one exemplary and non-limiting implementation, both the EntityComposite and EntityElement base classes provide the above-described basic facility services 202 through protected, non-virtual methods. One such method is a LookupService method which implements the lookup service 204 introduced in FIG. 2.

The LookupService method has aspects that involve both the EntityElement base class and the EntityComposite base class, with the EntityComposite base class providing functionality which is key to implementing the recursive lookup behavior illustrated in FIG. 3. More specifically, upon the initiation of a lookup operation associated with a particular element component, the LookupService in the EntityElement base class immediately defers to its parent EntityComposite component, referred to herein as the p-1 parent EntityComposite component.

The p-1 parent EntityComposite component responds to the EntityElement component by carrying out its part of the LookupSerivce. This involves first consulting a set of services published by the p-1 parent EntityComposite component. If the p-1 parent EntityComposite component cannot find the requested service type among the published services, it defers upward to its own parent EntityComposite component, referred to herein as the p-2 parent EntityComposite component.

The p-2 parent EntityComposite component responds in the same manner as the p-1 parent EntityComposite component. That is, it invokes the LookupService by first consulting a set of services published by it, and if it cannot find the requested service, defers to its respective parent EntityComposite component (i.e., a p-3 parent EntityComposite component). This process is repeated until the requested service is found (or it is determined that the requested service cannot be found).

However, a specially configured composite component which introduces an isolating service scope (thus isolating their contained components with respect to available services) will not defer to its respective parent EntityComposite component, and therefore will not support the recursive lookup operation described above. In other words, requests for services terminate when they reach such an entity domain in which the isolating feature has been invoked.

With respect to the error handling service 210, both Entity Element and EntityComposite base classes have a protected method to report errors encountered by a component. (This is implemented as an encapsulation of a lookup operation to access error handling functionality in the event of an error, followed by an invocation of that functionality.) More specifically, the error handling method can route such errors to the immediately enclosing error-handling domain containing the component (that is, an entity domain which exposes an error-handling service). If the error handler can contain the error, it takes appropriate actions. If the error handler does not know how to handle an error, it defers the error up to the next enclosing error handling domain.

According to another feature, element components can discover their entity domain parent by using a Parent property on the EntityElement base class. Element components can use this functionality to create new peers within the containing entity domain.

B. Exemplary Services

This section describes exemplary services that can be implemented by the entity domain framework 100 of FIG. 1. Namely, subsection B.1 describes the lifetime service 208, and subsection B.2 describes the error handling service 210.

B.1. Lifetime Domain

Figure 4:
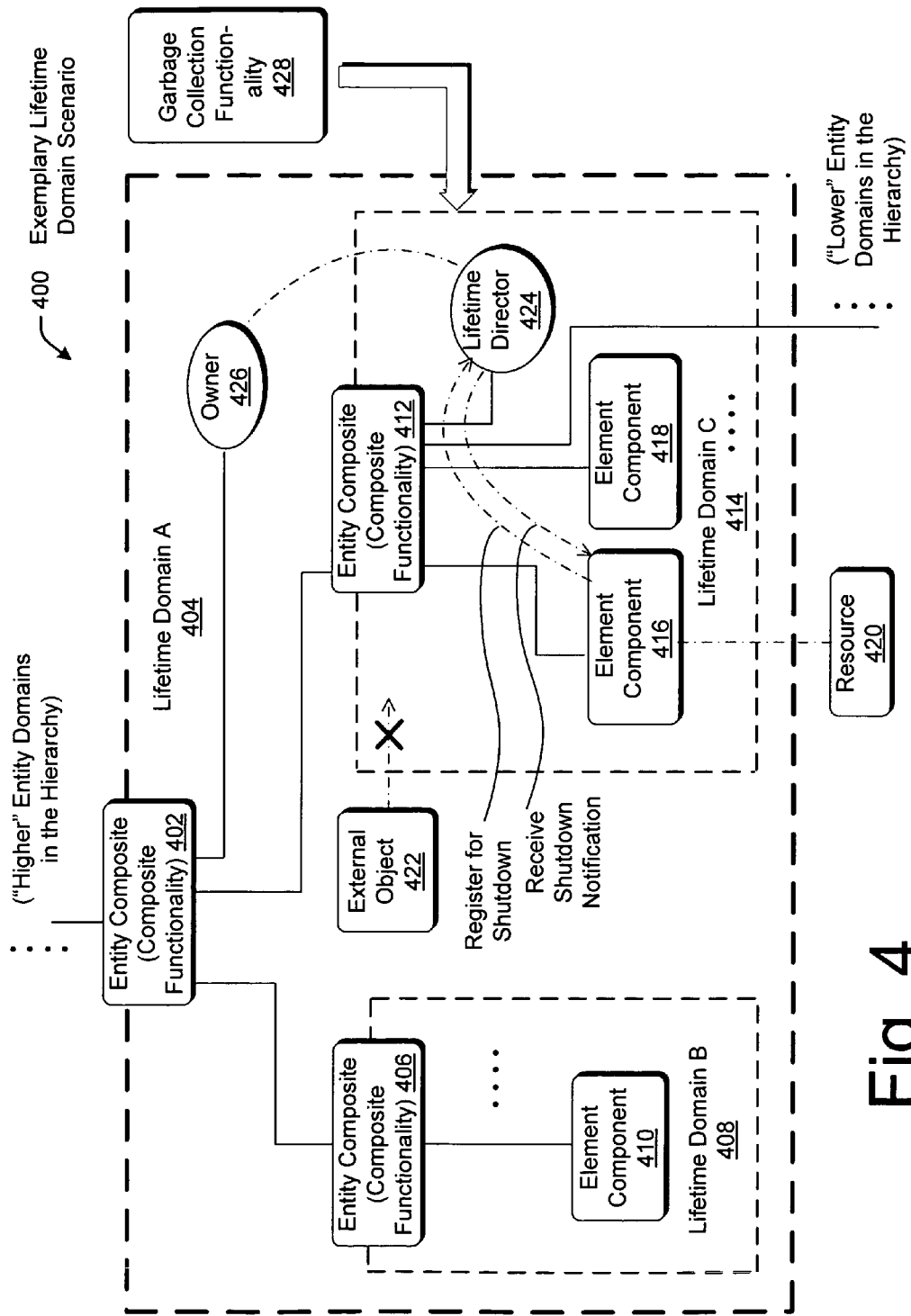
FIG. 4 illustrates an exemplary application of the entity domain framework of FIG. 1 to the task of lifetime management.

FIG. 4 shows an entity domain framework 400 which is used as a vehicle for explaining the lifetime service 208. As described above, an entity domain that implements the lifetime service 208 is referred to as a lifetime domain. The lifetime service 208, in turn, provides functionality used to govern the removal of components during an application's runtime.

To begin with, the entity domain framework 400 can be constructed in piecemeal fashion starting with a root node (not shown). The root node defines certain general aspects of the application. The creation process adds further components to the root node, which then serve as platforms to add further components. The process proceeds in this top-down manner as the application is built and run. At the same time, functionality to be described below is also at work pruning the thus-created entity domain framework to remove components that are no longer needed.

The root node corresponds to the most encompassing lifetime domain provided by the application. The application can thereafter create additional nested lifetime domains which govern the lifetime of additional respective groups of components. A developer can provide code which partitions the evolving entity domain framework 400 into different domains based on different considerations. For example, a developer may decide to allocate a separate lifetime to a group of components because one or more of the following factors apply: (a) the group of components is generally created and removed by the application as a unit; (b) the group of components can have a shorter lifetime than the group's enclosing lifetime domain; (c) the group of components requires deterministic shutdown; and/or (d) components within the group require explicit shutdown notification to release resources with which they may be interacting. The term "deterministic shutdown" generally refers to a shutdown process that is carried out in accordance with a defined protocol (e.g., in accordance with a defined sequence of operations), in response to a certain shutdown event. Deterministic shutdown provides predictability in the shutdown operation. Thus, in a more specific exemplary context, deterministic shutdown refers to a shutdown process that has predictable ordering and a predictable end result (e.g., the process completing synchronously once initiated). In contrast, traditional garbage collection techniques do not readily allow one to predict when an instance will be subject to garbage collection once it becomes unreferenced (that is, once it is no longer referenced by another component). Further, if there is some relationship between two instances that are both candidates for removal, traditional garbage collection techniques do not readily allow one to predict the order in which they will be removed.

For example, consider the case of a parent entity domain that corresponds to a list UI element and a child entity domain that corresponds to a table UI element that is included in the list element. It is possible that the table element may need to be removed prior to the list element as a whole. This may be caused by a scrolling event which prompts the removal of the table element, but not the entire list element. This circumstance may, in part, make it appropriate to assign a separate lifetime domain to the table element. Moreover, if the entirety of the list element is removed, then the table element should also be removed. This circumstance makes it appropriate to nest the table element's lifetime domain within the lifetime domain of the list element, such that shutdown of the enclosing lifetime domain will prompt the shutdown of the table element's lifetime domain too.

Different applications and design considerations will warrant the creation of different lifetime domain partitions. To provide a vehicle for discussion, FIG. 4 represents part of one exemplary and non-limiting entity domain structure 400. The entity domain framework 400 includes composite functionality 402 that defines a first-level lifetime domain 404. Second composite functionality 406 is coupled to the first composite functionality 402. This second composite functionality 406 establishes a second lifetime domain 408, which include an illustrative element component 410. Third composite functionality 412 is also coupled to the first composite functionality 402. This third composite functionality 412 establishes a third lifetime domain 414, which includes element components 416 and 418. Element component 416 is configured to interact with various resources 420, such as a database. This role makes element component 416 a resource manager. Finally, various entities outside the exemplary lifetime domain 414, such as object 422, may hold references which point to components within the lifetime domain 414.

To create the lifetime domains (404, 408, 414), the entity domain hierarchy 400 provides one or more so-called lifetime directors. These directors generally implement aspects of the lifetime service 208 (introduced with reference to FIG. 2). In one exemplary implementation, each lifetime domain (404, 408, 414) includes it own lifetime director. However, FIG. 4 focuses primarily on the interaction between the first lifetime domain 404 and the third lifetime domain 414, and therefore only illustrates a lifetime director 424 associated with the third lifetime domain 414 to facilitate discussion. The basic purpose of the lifetime director 424 is to coordinate shutdown activities within the third lifetime domain 414.

According to another aspect, the lifetime service 208 optionally accepts an owner for the lifetime domain it defines. FIG. 4 shows one exemplary owner 426 that "owns" the third lifetime domain 414. There is one a one-to-one relationship between owner 426 and its lifetime domain 414. However, in other cases, a single owner may control multiple lifetime domains. The basic purpose of the owner 426 is to initiate the shutdown of the third lifetime domain 414 and also to sever the external references pointing into the third lifetime domain 414 (e.g., from external object 422).

The director 424 acts within the third lifetime domain 414, whereas the owner 426 acts outside the third lifetime domain 414, typically in a lifetime domain (e.g., domain 404) that encloses the third lifetime domain 414. The lifetime director 424 holds a reference to its lifetime owner 426. The lifetime owner 426, in turn, holds a reference to the composite functionality 412 of the third lifetime domain 414 that it owns. In one implementation, the lifetime director 424 is the only agent that is aware of its owner counterpart 426 outside the lifetime domain 414.

The functions of the lifetime owner 426 and lifetime director 424 will be described in further detail below, starting with the lifetime owner 426. The lifetime owner 426 performs several roles.

One role is to initiate shutdown. In one case, the lifetime owner 426 can receive a specific request to shut down its lifetime domain 414. That is, in this case, the request specifically targets the lifetime domain 414. Shutdown will then proceed in deterministic fashion, as coordinated by the lifetime director 424. According to one general principle, a request to shut down an enclosing lifetime domain will also prompt the recursive shutdown of all of that enclosing domain's nested lifetime domains. This ensures that no dependent lifetime domain will outlive its enclosing (parent) lifetime domain. Consider the example where a parent lifetime domain corresponds to a scroll bar and a child lifetime domain corresponds to one part of that scroll bar. Removal of the entire scroll bar should prompt the removal of its component parts, prompting removal of all nested child domains corresponding to those parts.

One way of implementing this shutdown behavior is by requiring that each nested lifetime domain register its existence with its parent lifetime domain. As a result, a parent lifetime domain "knows" what nested lifetime domains are "under it." Then, when an event occurs that prompts the shutdown of a parent lifetime domain, a lifetime domain can access the registry of dependent lifetime domains and use it to forward shutdown instructions to each of its dependent lifetime domains. Shutdown of nested dependent domains is performed in recursive fashion. The shutdown starts with the most deeply nested, the second most deeply nested, and so forth, ending with the target lifetime domain that is to be shut down.

In another case, the lifetime owner 426 can receive a request from the lifetime director 424 that informs the lifetime owner 426 that the lifetime owner 426 itself is part of a lifetime domain that is shutting down (e.g., due to the type of nested shutdown operation described above).

The lifetime owner 426 can respond to shutdown by performing additional tasks besides initiating the shutdown. In one task, the lifetime owner 426 severs all references from external objects (e.g., from object 422) into the third lifetime domain 414. This severing of inward references is desirable to ensure that the subsystem being shut down can be reliably subject to garbage collection. In contrast, all references that stay entirely within a lifetime domain are unrestricted. Thus, no special lifetime management provisions need to be devoted to address these types of references. (References into a lifetime domain from outside of the domain are of particular interest because these references are the ones that keep a domain alive, e.g., by indicating whether the domain is still being utilized by the application in some way.)

In a similar vein, it is not necessary to sever any of the composite uplinks while executing the shutdown protocol. These uplinks can all be cut in one act by removing the single down-reference that anchors the outermost composite functionality subject to shutdown. In other words, the severing of the reference from a lifetime owner to its owned domain's composite functionality is strictly only necessary for the outermost lifetime domain being shut down.

Generally speaking, however, an entity domain may or may not include an owner. If a lifetime domain includes an owner, then it can be deterministically shutdown separately from its enclosing parent lifetime domain. A lifetime domain that includes an owner is referred to as an active domain. For instance, in the case of FIG. 4, because the third lifetime domain 414 includes an owner 426, it can be independently shut down from its parent lifetime domain 404 (although, as discussed above, the parent lifetime domain 404 cannot be shut down without also shutting down the child lifetime domain 414). In another scenario, the lifetime owner 426 can be omitted. A lifetime domain that lacks an owner is referred to as a passive domain. In this case, the third lifetime domain 414 would be automatically shutdown whenever its parent lifetime domain 404 is shut down, but not separately therefrom. As a further note, certain of the above-mentioned rules regarding the handling of external references apply only to active lifetime domains. A passive lifetime domain cannot be shut down in isolation; as a result, incoming references are unproblematic unless they also cross an enclosing active lifetime domain.

The lifetime director 424 also coordinates various activities associated with shutdown. Some of these functions were identified above, such as the coordinated shutdown of nested lifetime domains. According to another feature, the lifetime director 1424 also provides shutdown notifications to resource managers. More specifically, certain entities within a lifetime domain, such as element component 416, interact with one or more resources 420, such as a database, thereby making these components resource managers. By virtue of their roles, resource managers may control or influence the lifetimes of their associated resources. The lifetime director 424 addresses this relationship by providing a protocol which ensures the orderly and reliable shutdown of the resource managers. One way of implementing orderly shutdown is by requiring that each resource manager (e.g., resource manager 416) register with its encompassing lifetime domain 414. Then, upon shutdown, the lifetime director 424 can instruct these resource managers (e.g., resource manager 416) to release their association with their respective resources (e.g., resources 420).

Following successful shutdown, garbage collection functionality 428 can be run to remove components from an allocated memory heap that are no longer needed (although garbage collection is not formally a part of the lifetime management service per se). Garbage collection functionality is used in known systems, but distinctly not in the context described here. In traditional systems, the garbage collection functionality keeps detailed accounting of references associated with each active component stored in memory. When the garbage collection functionality discovers that a component no longer has any references to it (that is, the number of references=0), the garbage collection functionality removes the component. However, in these systems, there is no protocol to ensure that parts of an application are shut down correctly and that references to these parts are correctly removed when these parts are no longer needed. In marked contrast, the lifetime management described in the context of FIG. 4 provides a well-established protocol to shut down parts of an application as a precursor to garbage collection using a well-defined and predictable sequence of operations (e.g., deterministically, as defined above).

In general, it bears noting that, due to the provisions set forth above, the "up" references from element components to composite functionality (e.g., in the "direction" of child to parent) do not interfere with the garbage collection of the lifetime domains. The lifetime domain also maintains "down" references (in the direction of parent to child) to orchestrate shutdown. The orderly shutdown procedure severs these references when they are no longer needed, thereby preventing these references from inhibiting garbage collection of the lifetime domains that have been shut down.

With the above general features in mind, the following discussion sets forth one exemplary scenario in which shutdown is performed. Assume that the example developed above again applies. In this example, entity domain 404 manages the lifetime of a list UI element. The list UI element includes multiple parts, including a table UI element. Lifetime domain 414 can manage the lifetime of the table element.

The following events are performed to create the table element:

The list element first creates a lifetime owner for the table element. The lifetime owner may or may not be in a one-to-one association with the table element.

The list element then passes the lifetime owner along with itself as the parent of the table element component to construction functionality (e.g., so-called factory functionality) that creates the table element. (Any method that, by contract, creates and initializes a new instance and then hands it out to the caller is referred to as a factory method.)

When the construction functionality creates the table element, it must pass a parent reference (identifying the parent of the table element), and can optionally pass an owner reference (identifying the owner of the table element) to the constructor of the child. This completes the process of creating a table element.

The following sequence of events is performed to shutdown the table element:

The list element can request the lifetime owner 426 of the table element to shut down the table element.

The lifetime owner 426 of the table element notifies the lifetime director 424 of the table element to initiate shutdown.

The lifetime director 424 of the table element then requests the lifetime owner 426 of the table element to break all external references (from other lifetime domains) to the table element. This instruction prompts the lifetime owner 426 to sever the reference from external object 422.

The lifetime owner 426 releases its reference to the table element.

The lifetime director 424 also propagates the shutdown request to any child (nested) lifetime domains encompassed by its lifetime domain 414. For simplicity, assume that all children in the table element lifetime domain correspond to non-lifetime composites.

The lifetime director 424 of the table element notifies all components that have registered for shutdown notifications. These are the components, like component 416, which need to close resources or deregister from notifications. The lifetime director 424 then removes the table element from the child lifetime collection managed by the list element.

The call stack unwinds to the lifetime owner 426. The table element can be subjected to garbage collection at this point.

When the call unwinds to the list element, the list element may release its reference to the table owner 426, which can be subjected to garbage collection at this point as well.

The example set forth above involved a list of tables, where each table can be independently added and removed from the list, thereby warranting a lifetime domain for each table. The table in this example serves as an element. But one skilled in the art will appreciate that this example is merely illustrative. In another example, a table itself can be implemented as a list of UI elements, each element corresponding to a table row.

Similar lifetime management operations to those described above can be performed with respect to the individual elements of the table.

The entity domain framework 400 can implement the above-described lifetime framework 400 in various ways. For instance, the lifetime director 424 can be implemented as a special composite base class for entity composites (e.g., LifetimeDomainComposite). This is advantageous because it enables the lifetime director functionality to be sealed from composite implementers. More specifically, the LifetimeDomainComposite class is a special variant of an entity composite and hence derives from the EntityComposite base class discussed in Subsection A.4 (above).

More specifically, composite components that desire to establish lifetime domains can derive from the LifetimeDomainComposite base class. One of the parameters to the constructor of a composite class implementing a lifetime domain is its owner. This owner reference should be passed into the base class along with the parent reference. The owner reference can be stored in the base class and can be used to verify a caller during a shutdown operation. Passive lifetime domains (which have no owner) may be created by passing a null value for the owner parameter.

When a lifetime domain composite is instantiated, the LifetimeDomainComposite base class constructor looks up the next enclosing lifetime domain and registers itself with it in order to be able to participate in the shutdown protocol. As a result, a parent lifetime domain holds references to all of its nested child lifetime domains.

The above-described base class (LifetimeDomainComposite) includes functionality to support a lifetime domain. Exemplary interfaces implemented by this base class and their respective purposes are identified below. (The identified names of the interfaces are intended to be illustrative, rather than limiting.)

An IProvideShutdown interface is used by components to register for shutdown notifications.

An IInitiateShutdown interface is used by a lifetime owner to initiate shutdown on the lifetime domain it owns.

An IManageChildLifetimeDomainsinterface is used by child lifetime domains to add and remove the child lifetime domains from the enclosing lifetime domain.

An IShutdownThisLifetimeDomain interface is used to initiate shutdown of a nested lifetime domain while propagating the shutdown request to nested child lifetime domains.

The lifetime owner role can be implemented in various ways. The lifetime owner can correspond to some instance controlled by the containing entity composite. That is, the lifetime owner is typically an entity in its enclosing (that is, parent) composite. But it is also possible that the lifetime owner and its associated lifetime domain have only a common ancestor rather than the same immediate parent. In any event, the lifetime owner is given a reference to its owned lifetime domain when the owned lifetime domain is being constructed (by the LifetimeDomainComposite base class), at which point the lifetime owner stores a reference to the owned lifetime domain.

There are no restrictions on how the lifetime owner can be implemented, other than that it be configured to implement its assigned responsibilities described above. For example, the lifetime owner can initiate deterministic shutdown by calling the above-described IInitiateShutdown.Shutdown functionality. This prompts the LifetimeDomainComposite base class to verify that the caller is the lifetime owner by checking against the owner reference handed to it during construction. Deterministic shutdown can then be propagated through the lifetime domain hierarchy rooted at that lifetime domain (using the references to contained lifetime domains and using the IShutdownThisLifetimeDomain interface), thus shutting down all nested lifetime domains. This causes shutdown notifications to be sent to resource managers, providing an opportunity for these managers to release their resources deterministically.

Another of the roles of the lifetime owner is to be able to break all external references into its owned lifetime domain from objects outside of the domain. Clients of a lifetime domain should therefore build this knowledge into the lifetime owner. The lifetime owner implements IPrepareForShutdown functionality to break external references into a lifetime domain during shutdown. More specifically, when a lifetime director receives a shutdown request, it notifies the lifetime owner, using the IPrepareForShutdown interface, to initiate necessary actions to break external references into the lifetime domain from objects outside of it. Note that the lifetime owner receives the PrepareForShutdown request regardless of whether shutdown is initiated through that lifetime owner or whether it is participating in a nested shutdown. The lifetime owner should also release its reference to the owned lifetime domain during this call.

Resource managers (such as element component 416) can likewise be implemented in different ways. These managers can include a mechanism to participate in the shutdown process to deterministically release their resources. Such a mechanism can include functionality which allows the resource managers to subscribe to shutdown notifications. Resource managers can register for shutdown notifications with their enclosing lifetime domain using the IProvideShutdown interface identified above.

Further, resource managers can be configured to release their resources in various diverse scenarios. For example, a lifetime director can notify all of its registered resource managers of the shutdown even if one or more of the resource managers encounter errors while acting on this notification. In one exemplary case, resource managers can be prohibited from displaying any user interface presentations or initiating other long running operations when they are requested to shut down. Further, resource managers can be prohibited from performing operations during shutdown that can result in an exception being thrown.

As a final topic, testing mechanisms can be built that complement the use of lifetime domains to determine whether an application has any errors. In one technique, a test tool or harness can be constructed that leverages the fact that, at runtime, enclosing lifetime services can be determined, including their nesting relation. The test tool or harness can detect attempts to establish references in an incorrect direction. An exclusion mechanism is desirable to allow references into a lifetime domain that are under control of that domain's owner or a shutdown-cleanup mechanism.

Another approach is to perform "zombie" checks on debug builds. The idea here is to use appropriate runtime tools (such as Microsoft Corporation's CLR Performance Profiler) to extract all live references at a certain point in time, and then to hunt for components that are encompassed, either directly or indirectly, within a lifetime domain that has shut down. References pointing into an inactive domain keep components within this domain alive, making such components "zombies." The checking provision helps pinpoint references that violate the policy rules set forth by the lifetime services. Such a technique is not available to traditional techniques because these traditional techniques do not organize groups of components into lifetime domains as described herein.

The ability to discover zombies is particularly useful as such objects can present serious difficulties. Namely, should a thread of execution ever enter a zombie (by way of a method call over a weak reference, for instance), the zombie will typically make method calls into non-zombie instances in the application. The targets of such method calls commonly understand these zombies to be absent from the application and are thus not prepared to deal with calls from them. Various negative consequences can ensue.

B.2. Error Handling Domain

Figure 5:
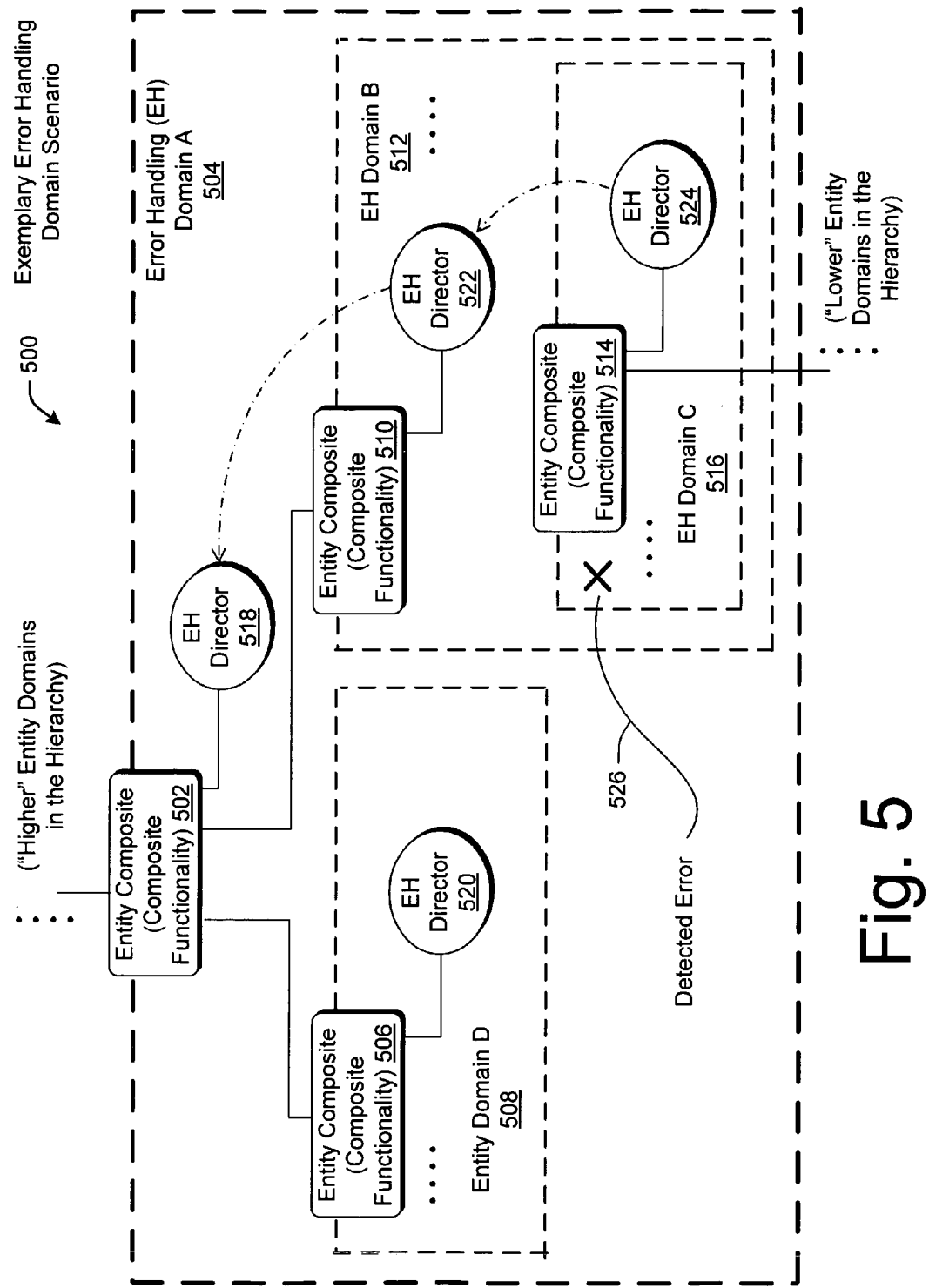
FIG. 5 illustrates an exemplary application of the entity domain framework of FIG. 1 to the task of error handling.

FIG. 5 shows an entity domain framework 500 which is used as a vehicle for explaining the error handling service 210. As described above, an entity domain that implements the error handling service 210 is referred to as an error handling domain. The error handling service 210, in turn, generally refers to any functionality for receiving and handling errors that occur in the entity domain framework 500, or possibly outside the entity domain framework, e.g., as a result of method calls from instances within an entity domain to instances outside of it.

FIG. 5 represents part of any exemplary and non-limiting entity domain structure 500, presented here for illustration purposes. The entity domain framework 500 includes composite functionality 502 that defines a first-level error handling domain 504. Second composite functionality 506 is coupled to the first composite functionality 502. This second composite functionality 506 establishes a second error handling domain 508. Third composite functionality 510 is also coupled to the first composite functionality 502. This third composite functionality 510 establishes a third error handling domain 512. Fourth composite functionality 514 is also coupled, in nested fashion, to the third composite functionality 510. This fourth composite functionality 514 establishes a fourth error handling domain 516.

The entity domain hierarchy 500 can implement different error handling services that apply to respective error handling domains using respective error handling directors. Namely, the first error handling domain 504 provides error handling director 518, the second error handling domain 508 provides error handling director 520, the third error handling domain 512 provides error handling director 522, and the fourth error handling domain 514 provides error handling director 524. Generally, the error handling directors (518, 520, 522, 524) perform the tasks of responding to errors detected in the entity domain framework 500. More specifically, each error handling director can implement custom error handling policies (e.g., by providing custom code that implements this functionality). That is, different error handling domains can apply different custom policies. This is in contrast to lifetime domains, where, in one exemplary case, all domains implement the same uniform service.

Once again, FIG. 5 can represent only a sample of a more encompassing entity domain framework 500, so the complete entity domain framework 500 may include many more error handling domains and associated error handling directors (not shown).

The following example illustrates the operation of the entity domain structure 500. Assume that an error is detected which is associated with the nested error handling domain 516. FIG. 5 pictorially represents such an error with an X 526. The error handling procedure first entails forwarding the error to the error handling director 524. The error handling procedure first attempts to address this error on a local basis using the local error handling director 524. However, because of the encapsulation employed in the entity domain framework 500, the error handling director 524 may not have full "understanding" (or any understanding) of the larger context in which the error handling domain 516 is situated within the application as whole. Because of this limitation, the error handling director 524 may not be able to successfully process the detected error. More specifically, the error handling director 524 may be configured to handle only certain classes of errors that can be successfully handled on a local scale without knowledge of the overarching context in which these errors occur; if the detected error does not fall into one of these classes, the error handling director 524 cannot process it.

In the event that error handling director 524 cannot successfully process the detected error, an error escalation process is performed whereby the task of processing the detected error is deferred to the next "higher" error handling director 522. This error handling director 522 then determines whether it can successfully process the detected error. If not, the error handling director 522 further defers the error processing task to the next "higher" error handling director 518. This process is repeated until the error is successfully processed or the process reaches the root of the entity domain framework 500, whereupon it becomes an "unhandled error."

An error handling director that can handle an error (based on its error handling services) can respond to the error in various ways. Error handling services typically handle the error by engaging the components in the error handling domain in some reset protocol. For example, the error handling processing can entail signaling all database connections in an error handling domain to reset themselves to some known good state before proceeding. The error handling processing can also entail shutting down part of the application, correcting certain information, logging certain information associated with the error, and so forth. If an enclosing error handling domain shuts down, it will shut down all of its nested error handling domains too.

In terms of implementation, to encapsulate the error-signaling protocol, the base classes EntityElement and EntityComposite can provide a protected instance method HandleError that an entity can call to invoke the enclosing error handling service. This functionality (whereby the appropriate error handler is invoked) operates using the above-described lookup service (see Subsections A.3 and A.4). More specifically, HandleError operates by performing a recursive search for an appropriate error handling service using the lookup service, and then by invoking the appropriate error handling service.

B.3. Other Service Domains

The above-identified services and associated entity domains can be applied to any kind of application. These services therefore have general applicability. Other services may be specifically tailored to complement the unique architecture of particular applications.

C. Method of Operation

Figure 6:
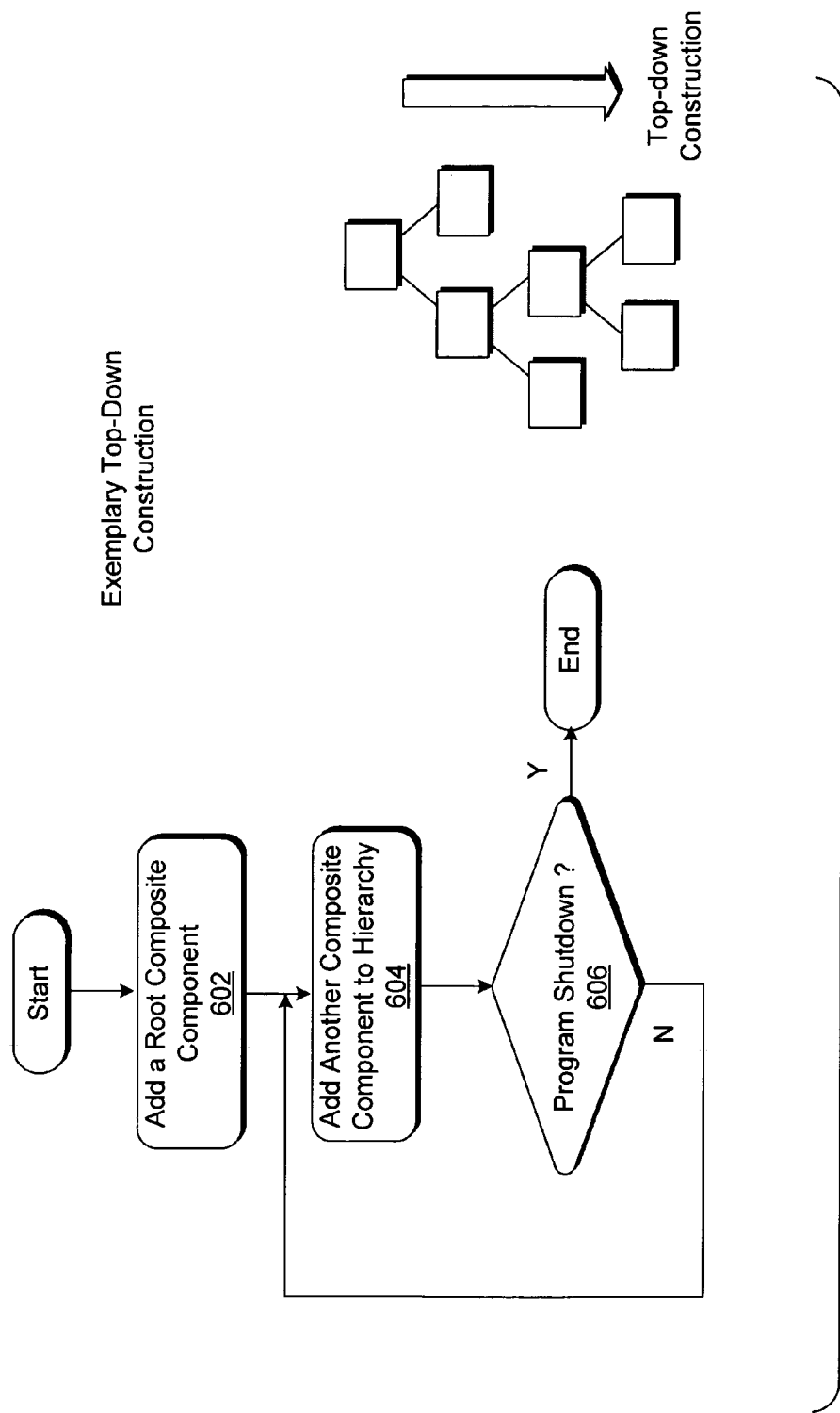
FIG. 6 illustrates an exemplary procedure for creating the entity domain framework of FIG. 1.
Figure 7:
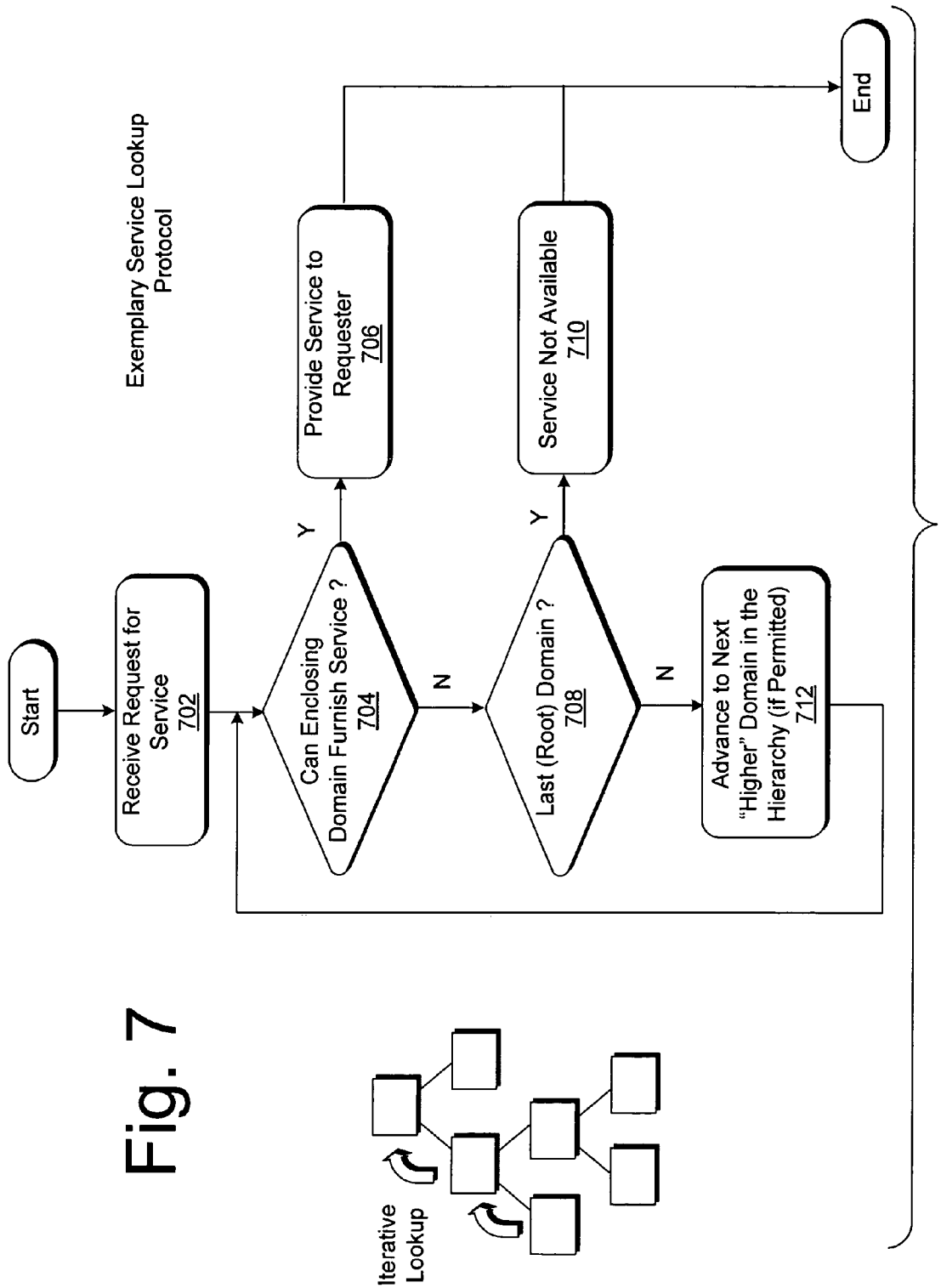
FIG. 7 illustrates an exemplary procedure for looking up a service within the entity domain framework of FIG. 1.
Figure 8:
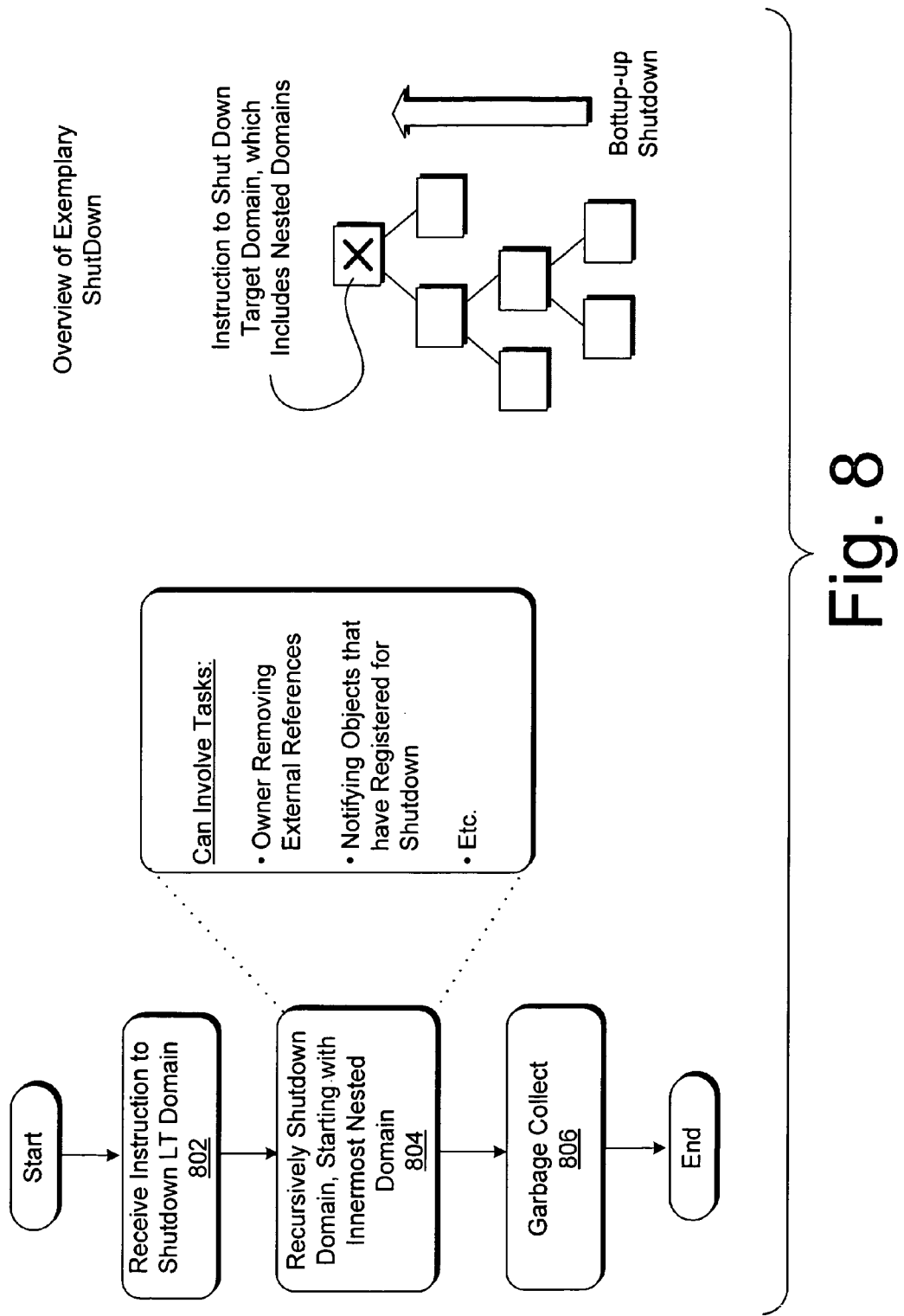
FIG. 8 illustrates an exemplary procedure for shutting down parts of the entity domain framework of FIG. 1.

FIGS. 6-8 summarize aspect of the above-described subject matter in flowchart form. To facilitate discussion, certain operations are described as constituting distinct steps performed in a certain order. Such implementations are exemplary and non-limiting. Certain steps described herein can be grouped together and performed in a single operation, and certain steps can be performed in an order that differs from the order employed in the examples set forth in this disclosure.

FIG. 6 describes a process for creating an entity domain framework having lifetime management services. In step 602, the application adds one or more initial root-type objects that define the overall entity domain of the application. Thereafter, in step 604, the application successively adds entity domains to the entity domain framework. The application performs this step (604) by adding composite functionality to the entity domain framework, effectively defining associated domains. The application can populate the entity domains by adding element components that are coupled to their respective composite functionality. Accordingly, the application builds the entity domain framework in nested top-down fashion. The top-down construction is also illustrated in the framework fragment to the right of the flowchart. The above-identified process continues until, in step 606, the application eventually shuts down in its entirety. Although not depicted in FIG. 6, the application performs another operation analogous to creation to remove components that are no longer needed.

In the context of the lifetime service 208, the application may decide to create distinct nested domains in a number of circumstances. For instance, the application may decide (by virtue of the developer's design objectives) to group a newly added collection of components into a separate lifetime domain if these components can potentially have a shorter lifetime than their enclosing (parent) lifetime domain, or if the components require explicit notification of shutdown, and so forth. If it is desirable to deterministically and independently shut down a lifetime domain, then the application should also assign a lifetime owner to the lifetime domain. The owner serves as the agent which initiates shutdown. Also, the owner is the agent which severs the links pointing from entities outside a lifetime domain to components within the lifetime domain.

FIG. 7 describes the operation of the basic lookup service 204. In step 702, a local entity domain receives a request for some service, such as an error handling service. In step 704, the local entity domain determines whether it can furnish the requested service. If so, in step 706, the local entity domain provides the requested service. If not, in step 708, the lookup service 204 determines whether there are other enclosing domains that can be queried for this service. There are two circumstances in which this query is answered in the negative. A first case occurs when the lookup service 204 has advanced to the root of the entity domain framework without finding the requested service. A second case occurs when developer has designated a domain as an isolated domain, which has the effect of blocking further advance up the chain of nested domains. In either of these cases, in step 710, the lookup service determines that the requested service is not available. However, if the lookup service determines that it can advance to an enclosing parent entity domain, in step 712, it does so. Thereupon, the sequence of operations shown in FIG. 7 is repeated with respect to the enclosing parent entity domain. The operation of the recursive lookup procedure is also illustrated in the domain fragment to the left of the flowchart. One way of implementing the above-described behavior is through a base class method called LookupService. This method is recursively invoked at successive levels, advancing up the hierarchy. This is a kind of "blind" advance up the chain in the sense that no child component has "knowledge" of the services provided by higher levels in the hierarchy. A component relies on the LookupService in the same manner as a component would place a request on a bus; namely, as in the case of a bus request, the component may not know or care what "actor" will satisfy the request, if any.

Finally, FIG. 8 illustrates an exemplary shutdown procedure for an entity domain framework governed by lifetime services. In step 802, some entity domain in the entity domain framework receives a request to shut down. In step 804, the shutdown request triggers a number of cleanup operations that were fully enumerated in Subsection B.1. In general, these operations can involve transmitting a shutdown request to all nested lifetime domains within the ultimate enclosing lifetime domain. Shutdown then proceeds in recursive fashion starting with the most deeply nested lifetime domain. At each level, shutdown can involve a number of substeps, some of which are enumerated in the expanded list to the right of step 804. In one substep, the owner can sever all references from outside a lifetime domain that point into the lifetime domain. In another substep, the lifetime director can send shutdown notifications to any resource manager within a lifetime domain that has previously registered to receive such shutdown notifications.

In step 804, garbage collection can be performed to remove objects from system memory that have no references pointing to them (indicating that they are no longer needed by the application). In one implementation, garbage collection (in step 804) is not formally part of the shutdown protocol provided by the lifetime management service, and is therefore not necessarily triggered by the lifetime management service. In other words, conventional garbage collection can be used in association with the lifetime services described herein. However, unlike traditional methods, garbage collection has been preceded by a unique deterministic shutdown protocol (defining an orderly and predictable sequence of shutdown operations), which better ensures that all of the objects that are no longer in use are subjected to garbage collection.

D. Exemplary Computing Environment

Figure 9:
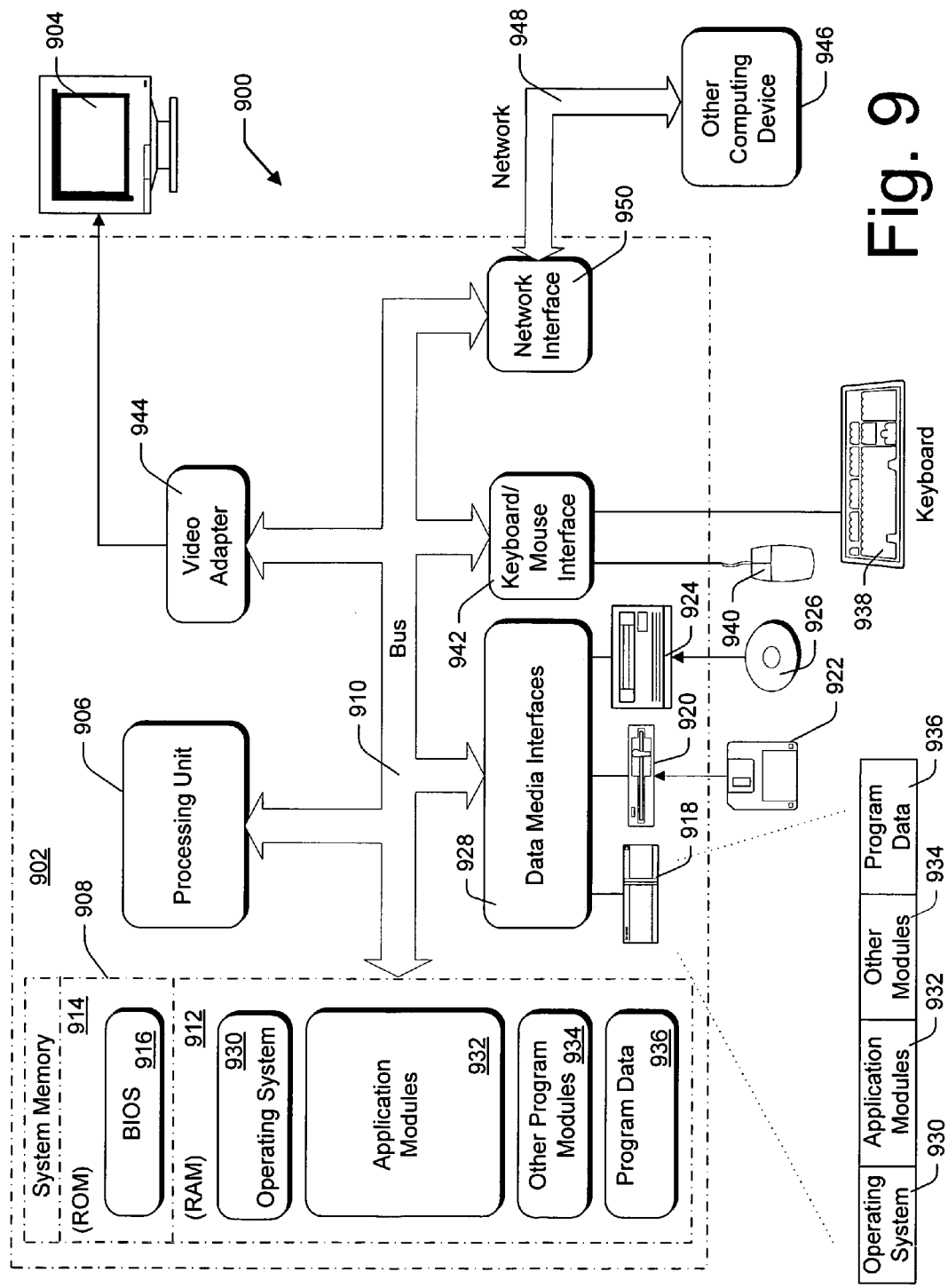
FIG. 9 illustrates an exemplary computing machine environment for implementing aspects of the entity domain framework shown in FIG. 1.

FIG. 9 provides information regarding one exemplary computer environment 900 that can be used to run an application program based on the entity domain framework paradigm.

The computing environment 900 includes a general purpose type computer 902 and a display device 904. However, the computing environment 900 can include other kinds of computing equipment. For example, although not shown, the computer environment 900 can include hand-held or laptop devices, set top boxes, game consoles, extension-type computers, mainframe computers, logic functionality embedded in rendering devices, and so forth. Further, FIG. 9 shows elements of the computer environment 900 grouped together to facilitate discussion. However, the computing environment 900 can employ a distributed processing configuration. In a distributed computing environment, computing resources can be physically dispersed throughout the environment.

Exemplary computer 902 includes one or more processors or processing units 906, a system memory 908, and a bus 910. The bus 910 connects various system components together. For instance, the bus 910 connects the processor 906 to the system memory 908. The bus 910 can be implemented using any kind of bus structure or combination of bus structures, including a memory bus or memory controller, a peripheral bus, an accelerated graphics port, and a processor or local bus using any of a variety of bus architectures.

Computer 902 can also include a variety of computer readable media, including a variety of types of volatile and non-volatile media, each of which can be removable or non-removable. For example, system memory 908 includes computer readable media in the form of volatile memory, such as random access memory (RAM) 912, and non-volatile memory, such as read only memory (ROM) 914. ROM 914 includes an input/output system (BIOS) 916 that contains the basic routines that help to transfer information between elements within computer 902, such as during start-up. RAM 912 typically contains data and/or program modules in a form that can be quickly accessed by processing unit 906.

Other kinds of computer storage media include a hard disk drive 918 for reading from and writing to a non-removable, non-volatile magnetic media, a magnetic disk drive 920 for reading from and writing to a removable, non-volatile magnetic disk 922 (e.g., a "floppy disk"), and an optical disk drive 924 for reading from and/or writing to a removable, non-volatile optical disk 926 such as a CD-ROM, DVD-ROM, or other optical media. The hard disk drive 918, magnetic disk drive 920, and optical disk drive 924 are each connected to the system bus 910 by one or more data media interfaces 928. Alternatively, the hard disk drive 918, magnetic disk drive 920, and optical disk drive 924 can be connected to the system bus 910 by a SCSI interface (not shown), or other coupling mechanism. Although not shown, the computer 902 can include other types of computer readable media, such as magnetic cassettes or other magnetic storage devices, flash memory cards, CD-ROM, digital versatile disks (DVD) or other optical storage, electrically erasable programmable read-only memory (EEPROM), etc.

Generally, the above-identified computer readable media provide non-volatile storage of computer readable instructions, data structures, program modules, and other data for use by computer 902. For instance, the readable media can store the operating system 930, application modules 932, other program modules 934, and program data 936. Parts of this media can also provide storage for implementing aspects of the object management functionality described in previous sections. Namely, memory can be allocated for storing runtime components governed by the previously described entity domain framework.

The computer environment 900 can include a variety of input devices. For instance, the computer environment 900 includes the keyboard 938 and a pointing device 940 (e.g., a "mouse") for entering commands and information into computer 902. The computer environment 900 can include other input devices (not illustrated), such as a microphone, joystick, game pad, satellite dish, serial port, scanner, card reading devices, digital or video camera, etc. Input/output interfaces 942 couple the input devices to the processing unit 906. More generally, input devices can be coupled to the computer 902 through any kind of interface and bus structures, such as a parallel port, serial port, game port, universal serial bus (USB) port, etc.

The computer environment 900 also includes the display device 904. A video adapter 944 couples the display device 904 to the bus 910. In addition to the display device 904, the computer environment 900 can include other output peripheral devices, such as speakers (not shown), a printer (not shown), etc.

Computer 902 operates in a networked environment using logical connections to one or more remote computers, such as a remote computing device 946. The remote computing device 946 can comprise any kind of computer equipment, including a general purpose personal computer, portable computer, a server, a game console, a network extension device, and so forth. Remote computing device 946 can include all of the features discussed above with respect to computer 902, or some subset thereof.

Any type of network 948 can be used to couple the computer 902 with remote computing device 946, such as a WAN, a LAN, etc. The computer 902 couples to the network 948 via network interface 950, which can utilize broadband connectivity, modem connectivity, DSL connectivity, or other connection strategy. Although not illustrated, the computing environment 900 can provide wireless communication functionality for connecting computer 902 with remote computing device 946 (e.g., via modulated radio signals, modulated infrared signals, etc.).

In closing, a number of examples were presented in this disclosure in the alternative (e.g., case A or case B). In addition, this disclosure encompasses those cases which combine alternatives in a single implementation (e.g., case A and case B), even though this disclosure may not have expressly mention these conjunctive cases in every instance.

More generally, although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method for running machine-readable code that includes a collection of components at runtime, the method comprising;

grouping, by a computing device configured to run machine-readable code that includes the collection of components at runtime, at least one code component into a hierarchically-structured entity domain, wherein the entity domain is subject to a prescribed policy; and managing, by the computing device configured to run machine-readable code that includes the collection of components at runtime, said at least one code component in accordance with the policy of the entity domain, wherein the policy provided by the entity domain pertains to lifetime management of said at least one component, and the managing comprises:

using the owner functionality to perform a severing of reference links from objects outside the entity domain into the entity domain;

providing a shutdown notification to at least one component which has registered to receive such notification in advance; and governing the deterministic shutdown of said at least one component based on the lifetime management policy wherein the lifetime management policy accommodates lifetime owner functionality.

2. The method of claim 1, wherein the entity domain provides composite functionality that couples said at least one component to the entity domain.

3. The method of claim 1, wherein the grouping comprises providing a plurality of entity domains subject to respective policies.

4. The method of claim 3, wherein the plurality of entity domains are constructed in top-down fashion.

5. The method of claim 3, wherein the plurality of entity domains are linked together in parent-child relationships.

6. The method of claim 3, wherein each of the entity domains provides respective composite functionality that couples the plurality of entity domains into a hierarchical entity domain framework.

7. The method of claim 6, wherein the composite functionality provided by the plurality of entity domains collectively defines a coupling mechanism through which an entity may send requests through the entity domain framework.

8. The method of claim 7, wherein a request associated with a particular entity domain is processed by:

(a) determining whether the particular entity domain can satisfy the request, and if so, processing the request at the particular entity domain;

(b) if the particular entity domain cannot satisfy the request, determining whether the particular entity domain's parent entity domain can satisfy the request, and if so, processing the request at the parent entity domain; and (c) if the parent entity domain cannot satisfy the request, repeating operation (b) until the request is satisfied or it is determined that the request cannot be satisfied.

9. The method of claim 1, wherein the entity domain includes plural components, and the managing comprises shutting down of the plural components as a unit.

10. The method of claim 1, wherein the entity domain is an enclosing lifetime domain that includes at least one nested domain, and the managing coordinates the shutdown of said at least one nested lifetime domain prior to the enclosing lifetime domain.

11. The method of claim 1, wherein the lifetime management policy accommodates lifetime owner functionality, provided outside of the entity domain, and the managing comprises using the owner functionality to initiate the shutdown of said at least one component.

12. The method of claim 1, wherein the policy provided by the entity domain pertains to error handling management, and wherein the managing comprises governing the orderly handling of errors associated with the entity domain based on the error handling management policy.

13. The method of claim 12, wherein the entity domain includes plural components, and the managing comprises applying the same error handling management policy to all of the plural components.

14. The method of claim 12, wherein the entity domain is a nested entity domain within at least one other enclosing entity domain, and wherein the managing comprises deferring an error handling task to said at least one enclosing entity domain if the nested entity domain cannot satisfactorily process the error handling task.

15. A machine-readable media for implementing the grouping and managing of claim 1.

16. An apparatus including logic configured to implement the grouping and managing of claim 1.

17. A machine-readable storage medium providing a data structure that implements an entity domain framework, the data structure comprising:
a hierarchically-structured entity domain that includes at least one code component;
a computing device configured to run machine-readable code that includes the at least one code component, and
service functionality associated with the entity domain, defining a prescribed policy that applies to said at least one component, wherein the policy defined by the service functionality associated with the entity domain pertains to lifetime management of said at least one component, governing the deterministic shutdown of said at least one component based on the lifetime management policy.

18. The machine-readable media of claim 17, wherein the entity domain provides composite functionality that couples said at least one component to the entity domain.

19. The machine-readable media of claim 17, wherein the entity domain framework includes a plurality of entity domains having respective service functionality that defines respective policies.

20. The machine-readable media of claim 19, wherein the plurality of entity domains are linked together in parent-child relationships.

21. The machine-readable media of claim 19, wherein each of the entity domains provides respective composite functionality that couples the plurality of entity domains together to define the entity domain framework.

22. The machine-readable media of claim 21, wherein the composite functionality provided by the plurality of entity domains collectively defines a coupling mechanism through which an entity may send requests through the entity domain framework.

23. The machine-readable media of claim 17, wherein the policy provided by the entity domain pertains to error handling management, governing the orderly handling of errors associated with the entity domain based on the error handling management policy.

24. An apparatus for providing an application, the apparatus comprising:
a memory for storing components that implement parts of the application at runtime;
a processing device configured to execute instructions to:
organize at least one code component into a hierarchically-structured entity domain framework, and store said at least one entity domain in memory; and
logic configured to manage said at least one code component in accordance with a policy of the entity domain, wherein the policy includes a lifetime management policy facilitating a deterministic shutdown of the at least one code component, the deterministic shutdown comprising:
coordinating a recursive shutdown of any nested lifetime entity domains included within the hierarchically-structured entity domain framework;
providing a shutdown notification to the at least one registered component which has registered to receive such notification in advance; and
severing reference links from components outside the hierarchically-structured entity domain framework into the hierarchically-structured entity domain framework;
and further wherein the entity domain provides respective composite functionality that couples the entity domain into the hierarchically-structured entity domain framework, the composite functionality provided by the entity domain collectively defines a bus through which an entity may send requests through the hierarchically-structured entity domain framework.

25. The apparatus of claim 24, wherein the entity domain provides composite functionality that couples said at least one component to the entity domain.

26. The apparatus of claim 24, further comprising a plurality of entity domains subject to plural respective policies.

27. The apparatus of claim 26, wherein the plurality of entity domains are linked together in parent-child relationships.

28. The apparatus of claim 24, wherein policy provided by the entity domain pertains to lifetime management of said at least one component, governing the deterministic shutdown of said at least one component based on the lifetime management policy.

29. The apparatus of claim 24, wherein the policy provided by the entity domain pertains to error handling management, governing the orderly handling of errors associated with the entity domain based on the error handling management policy.

30. A method for running machine-readable code that includes a collection of components at runtime, the method comprising:
grouping, by a computing device configured to run machine-readable code that includes the collection of components at runtime, at least one code component into a hierarchically-structured entity domain framework, the code component comprising objects or instances configured to perform prescribed tasks, wherein the hierarchically-structured entity domain framework is subject to at least one prescribed policy, and further wherein the hierarchically-structured entity domain framework includes entity domains linked together in a parent-child relationship;

processing, by the computing device configured to run machine-readable code that includes the collection of components at runtime, a requested service made within a child entity domain, the processing comprising:
  determining whether the child entity domain can satisfy a service request;
  if the child entity domain can satisfy the service request, processing the service request at the child entity domain;
  if the child entity domain cannot satisfy the service request, determining whether a parent entity domain, can satisfy the service request;
  if the parent entity domain can satisfy the service request, processing the request at the parent entity domain;
  if the parent entity domain cannot satisfy the service request, recursively determining if the service request can be satisfied while advancing up the hierarchically-structured entity domain framework until the service request is satisfied or it is determined that the requested service is not available;
managing, by the computing device configured to run machine-readable code that includes the collection of components at runtime, the at least one code component in accordance with the at least one prescribed policy of the hierarchically-structured entity domain framework, the at least one prescribed policy including:
  a lifetime management policy;
  an error handling management policy;
  the lifetime management policy facilitating a deterministic shutdown of the at least one code component, the deterministic shutdown comprising:
    coordinating a recursive shutdown of any nested lifetime entity domains included within the hierarchically-structured entity domain framework;
    providing a shutdown notification to the at least one registered component which has registered to receive such notification in advance; and
    severing reference links from components outside the hierarchically-structured entity domain framework into the hierarchically-structured entity domain framework; and
  the error handling management policy facilitating an orderly handling of errors associated with an error handling domain, the error handling management policy governing deference an error handling task to the at least one parent entity domain if the child entity domain cannot process the error handling task.

31. The method as recited in claim 30, wherein the grouping comprises a plurality of entity domains subject to respective policies, the plurality of entity domains performing act comprising:
  providing composite functionality, wherein the composite functionality:
    collectively defines a coupling mechanism through which an entity sends one or more requests through a hierarchically-structured entity domain framework;
    couples the plurality of entity domains into the hierarchical entity domain framework, wherein the plurality of hierarchically-structured entity domains are linked together in parent-child relationships.

* * * * *